United States Patent
Koo et al.

(10) Patent No.: US 11,941,906 B2
(45) Date of Patent: Mar. 26, 2024

(54) METHOD FOR IDENTIFYING USER'S REAL HAND AND WEARABLE DEVICE THEREFOR

(71) Applicant: SAMSUNG ELECTRONICS CO., LTD., Suwon-si (KR)

(72) Inventors: Bonkon Koo, Suwon-si (KR); Jaewoo Ko, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 311 days.

(21) Appl. No.: 17/294,917

(22) PCT Filed: Jun. 10, 2019

(86) PCT No.: PCT/KR2019/006946
§ 371 (c)(1),
(2) Date: May 18, 2021

(87) PCT Pub. No.: WO2020/138602
PCT Pub. Date: Jul. 2, 2020

(65) Prior Publication Data
US 2022/0004750 A1    Jan. 6, 2022

(30) Foreign Application Priority Data
Dec. 26, 2018  (KR) .......... 10-2018-0169909

(51) Int. Cl.
*G06V 40/10*    (2022.01)
*G02B 27/01*    (2006.01)
(Continued)

(52) U.S. Cl.
CPC ......... *G06V 40/107* (2022.01); *G02B 27/017* (2013.01); *G06F 3/017* (2013.01);
(Continued)

(58) Field of Classification Search
CPC .... G06V 40/107; G06V 40/103; G06V 40/28; G06V 40/40; G06V 20/20; G02B 27/017;
(Continued)

(56) References Cited

U.S. PATENT DOCUMENTS

| 8,937,589 B2 * | 1/2015 | Wei ............. G06F 3/017 |
| | | 382/103 |
| 9,280,703 B2 | 3/2016 | Yun et al. |

(Continued)

FOREIGN PATENT DOCUMENTS

| CN | 105765516 A | 7/2016 |
| CN | 106922185 A | 7/2017 |

(Continued)

OTHER PUBLICATIONS

International Search Report and Written Opinion dated Sep. 24, 2019 issued by the International Searching Authority in International Application No. PCT/KR2019/006946 (PCT/ISA/220, PCT/ISA/210, and PCT/ISA/237).

(Continued)

*Primary Examiner* — Michael S Osinski
(74) *Attorney, Agent, or Firm* — Sughrue Mion, PLLC

(57) ABSTRACT

Provided is a method of identifying a hand of a genuine user wearing a wearable device. According to an embodiment, the method includes using a sensor included in the wearable device to recognize a hand located in a detection area of the sensor; estimating a position of a shoulder connected to the recognized hand based on a positional relation between the orientation of the recognized hand and at least one body part connected to the recognized hand; and using information about a probability of a shoulder of the genuine user being present in the estimated position to determine whether the recognized hand is a hand of the genuine user.

19 Claims, 22 Drawing Sheets

(51) Int. Cl.
*G06F 3/01* (2006.01)
*G06V 40/20* (2022.01)
*G06V 40/40* (2022.01)

(52) U.S. Cl.
CPC ............ *G06V 40/103* (2022.01); *G06V 40/28* (2022.01); *G06V 40/40* (2022.01)

(58) Field of Classification Search
CPC .... G02B 2027/0178; G02B 2027/0138; G02B 2027/014; G02B 27/0172; G06F 3/017; G06F 3/0304; G06F 3/011; G06F 3/005; G06F 3/012; G06F 1/163; G06F 3/04815; G06F 18/00; G06F 3/048; G06F 3/013; G06F 3/014; G06T 19/006; G06T 2207/30196; G06T 2207/10028; G06T 7/70

See application file for complete search history.

(56) References Cited

U.S. PATENT DOCUMENTS

| | | | |
|---|---|---|---|
| 9,286,694 | B2 | 3/2016 | Kim et al. |
| 9,298,970 | B2* | 3/2016 | Wang ................... G06V 40/161 |
| 9,530,232 | B2* | 12/2016 | Maciocci ............... G06V 20/20 |
| 9,690,371 | B2 | 6/2017 | Saito |
| 9,983,686 | B2 | 5/2018 | Horowitz et al. |
| 10,043,314 | B2* | 8/2018 | Koga ....................... G06F 1/163 |
| 10,048,761 | B2 | 8/2018 | Forutanpour et al. |
| 10,140,507 | B2* | 11/2018 | Srivastava ............. G06V 40/28 |
| 10,534,442 | B2* | 1/2020 | Yun ........................ G06F 3/0304 |
| 10,642,369 | B2* | 5/2020 | Iyer ......................... G06V 40/11 |
| 10,649,212 | B2* | 5/2020 | Burns ..................... G06F 3/012 |
| 10,713,848 | B2* | 7/2020 | Lee ............................ G06F 3/14 |
| 11,016,116 | B2* | 5/2021 | Erivantcev ............. G06F 18/00 |
| 11,580,700 | B2* | 2/2023 | Egri ...................... G06F 3/04815 |
| 11,599,237 | B2* | 3/2023 | Holz ....................... G06F 3/011 |
| 11,694,242 | B2* | 7/2023 | Yanagisawa ............ G06F 3/012 705/26.1 |
| 11,747,634 | B1* | 9/2023 | Mullins ................... G06F 3/012 345/633 |
| 2010/0063794 | A1* | 3/2010 | Hernandez-Rebollar .................... G06V 40/28 704/271 |
| 2011/0306422 | A1* | 12/2011 | Nishimoto ............. A63F 13/213 345/473 |
| 2012/0155773 | A1* | 6/2012 | Tsukamoto ........ H04N 1/00336 382/190 |
| 2012/0206452 | A1* | 8/2012 | Geisner ................... G06F 3/013 345/419 |
| 2012/0242800 | A1* | 9/2012 | Ionescu ................ G06V 40/107 348/46 |
| 2012/0249416 | A1 | 10/2012 | Maciocci et al. |
| 2012/0249590 | A1 | 10/2012 | Maciocci et al. |
| 2013/0141607 | A1* | 6/2013 | Anabuki ................. H04N 23/62 348/222.1 |
| 2013/0194175 | A1* | 8/2013 | Tarama ................. G06F 3/0484 345/156 |
| 2014/0063060 | A1* | 3/2014 | Maciocci ................ G06F 3/011 345/633 |
| 2015/0055828 | A1* | 2/2015 | Zhao ....................... G06T 7/248 382/103 |
| 2015/0062010 | A1* | 3/2015 | Lin .......................... G06F 3/017 345/157 |
| 2015/0154453 | A1* | 6/2015 | Wilf ....................... G06T 7/564 382/103 |
| 2015/0199824 | A1* | 7/2015 | Kim ....................... G06V 40/28 382/103 |
| 2015/0379770 | A1* | 12/2015 | Haley, Jr. ............... G09G 5/006 345/633 |
| 2016/0004907 | A1 | 1/2016 | Lundberg |
| 2016/0021353 | A1* | 1/2016 | Lundberg ............... G02B 30/27 348/54 |
| 2016/0091965 | A1 | 3/2016 | Wang et al. |
| 2017/0330569 | A1 | 11/2017 | Yoshikawa et al. |
| 2018/0075655 | A1 | 3/2018 | Cabanier et al. |
| 2018/0088792 | A1 | 3/2018 | Klein et al. |
| 2018/0114366 | A1 | 4/2018 | Ivers et al. |
| 2018/0120950 | A1 | 5/2018 | Karmon et al. |
| 2018/0136721 | A1 | 5/2018 | Alleaume et al. |
| 2018/0153445 | A1* | 6/2018 | Noda ....................... A61B 5/11 |
| 2018/0173315 | A1 | 6/2018 | Hall et al. |
| 2018/0189556 | A1 | 7/2018 | Shamir et al. |
| 2018/0196522 | A1 | 7/2018 | Rochford et al. |
| 2018/0196969 | A1 | 7/2018 | Herger et al. |
| 2018/0203518 | A1 | 7/2018 | McCoy et al. |
| 2018/0218515 | A1* | 8/2018 | Terekhov ............... G06V 10/24 |
| 2018/0285634 | A1* | 10/2018 | Varadarajan ......... G06V 40/107 |
| 2019/0033589 | A1* | 1/2019 | Watari .................... G06F 3/011 |
| 2019/0089946 | A1* | 3/2019 | Watari ................... H04N 13/30 |
| 2019/0171296 | A1* | 6/2019 | Kito ....................... G06V 40/28 |
| 2019/0212359 | A1* | 7/2019 | Erivantcev ............. G06F 3/014 |
| 2019/0384407 | A1* | 12/2019 | Smith .................... G06V 40/11 |
| 2019/0389352 | A1* | 12/2019 | Koller ...................... B60N 2/77 |
| 2020/0272228 | A1* | 8/2020 | Ding .......................... G06T 7/70 |
| 2020/0387227 | A1* | 12/2020 | Erivantcev ............. G06F 3/011 |
| 2021/0035326 | A1* | 2/2021 | Koike ................. H04N 23/698 |

FOREIGN PATENT DOCUMENTS

| | | |
|---|---|---|
| EP | 3358454 A1 | 8/2018 |
| JP | 2015-45805 A | 3/2015 |
| KR | 10-1700817 B1 | 2/2017 |
| KR | 10-2017-0078488 A | 7/2017 |
| KR | 10-1868903 B1 | 6/2018 |
| KR | 10-1876543 B1 | 7/2018 |

OTHER PUBLICATIONS

Communication dated Mar. 9, 2023 by the European Patent Office in European Patent Application No. 19904247.4.
Communication dated Nov. 10, 2021 issued by the European Patent Office in European Application No. 19904247.4.
Mathe, E., et al., "Arm Gesture Recognition using a Convolutional Neural Network", 2018, IEEE, XP033423850, pp. 37-42.
Office Action dated Nov. 21, 2023, issued by China National Intellectual Property Administration in Chinese Patent Application No. 201980086532.2.
Communication dated Jan. 19, 2024, issued by European Patent Office in European Patent Application No. 19904247.4.

* cited by examiner

FIG. 1
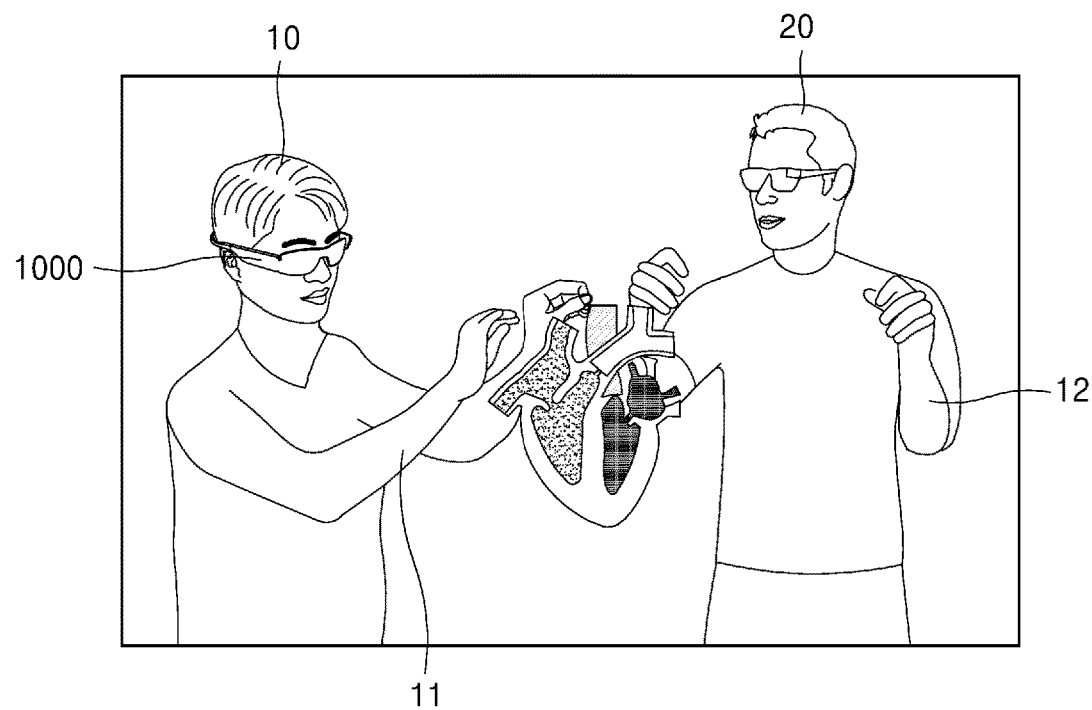
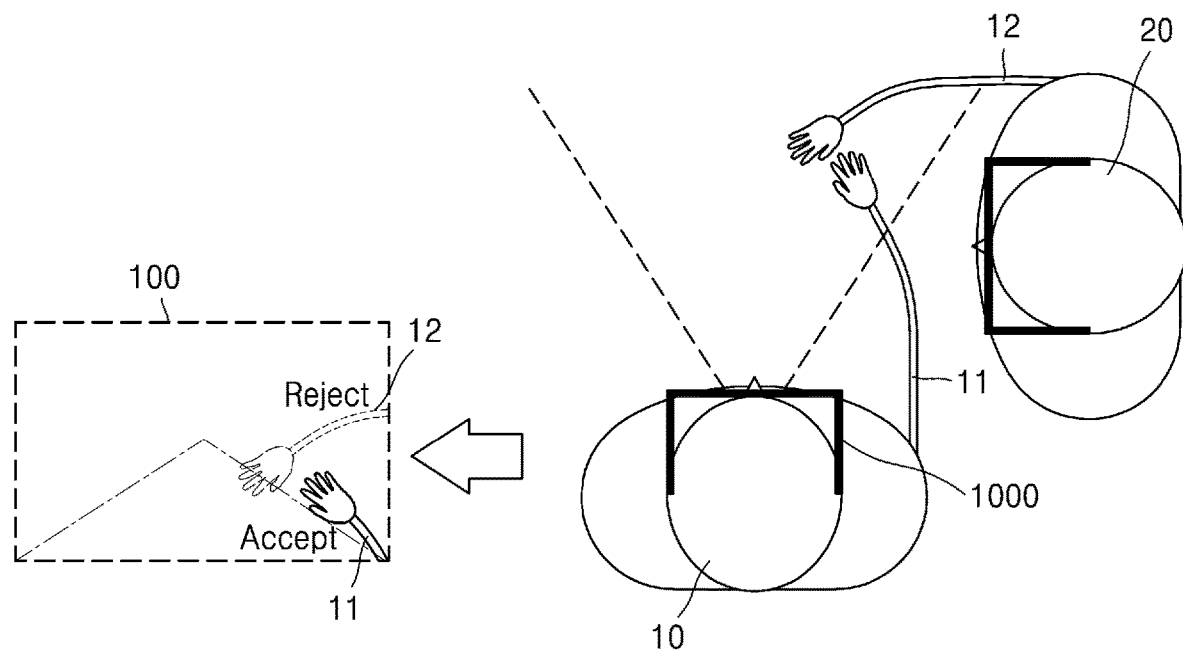

FIG. 12
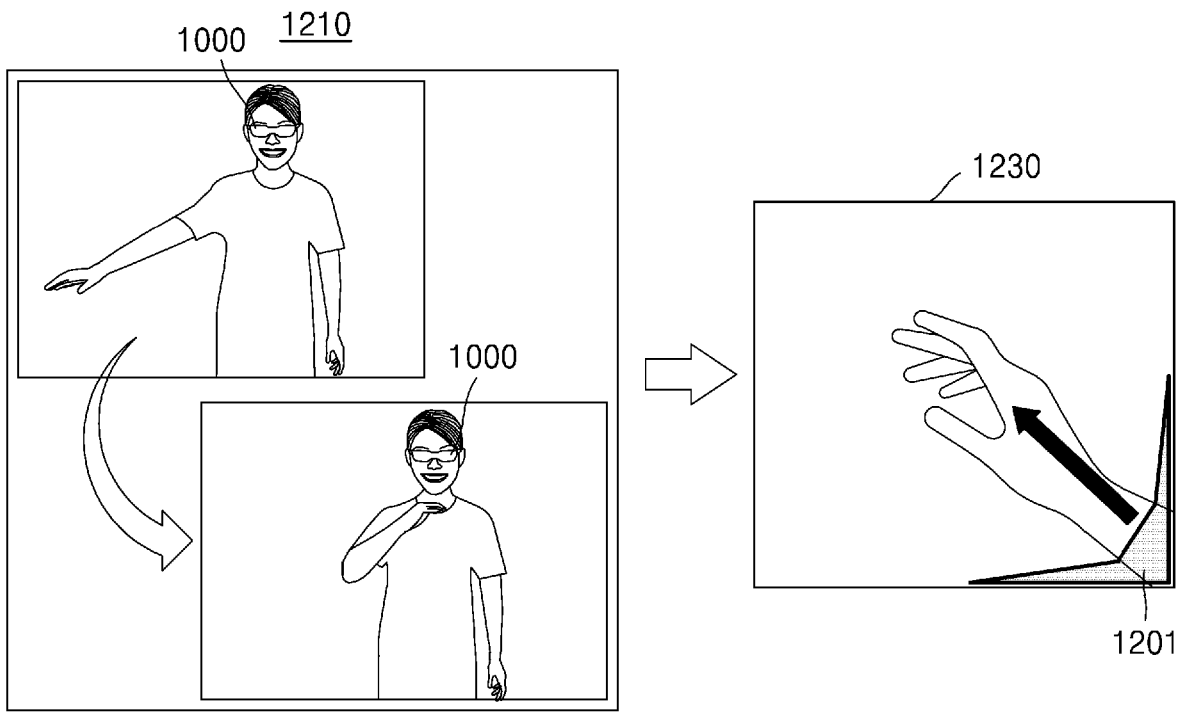
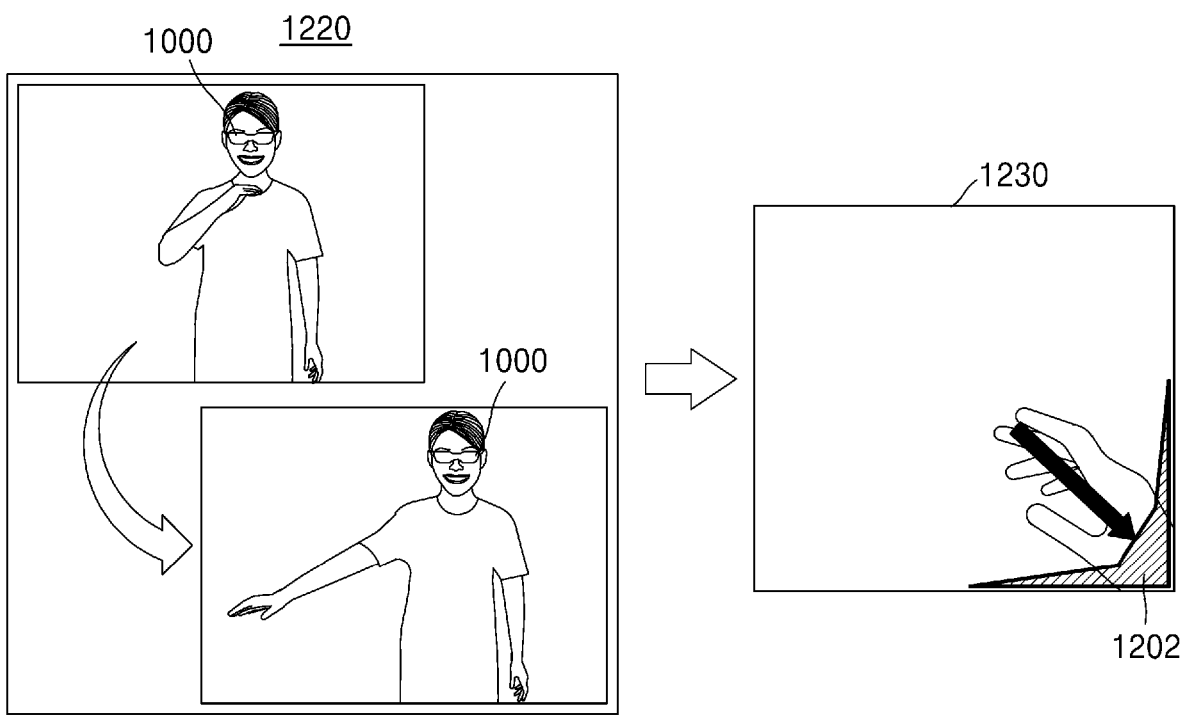

FIG. 15
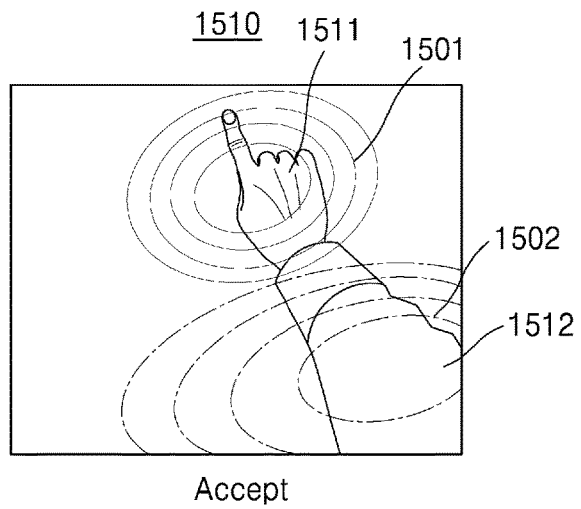
Accept
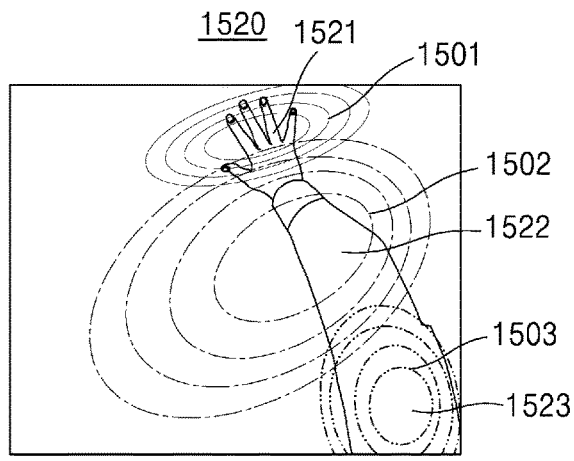
Accept
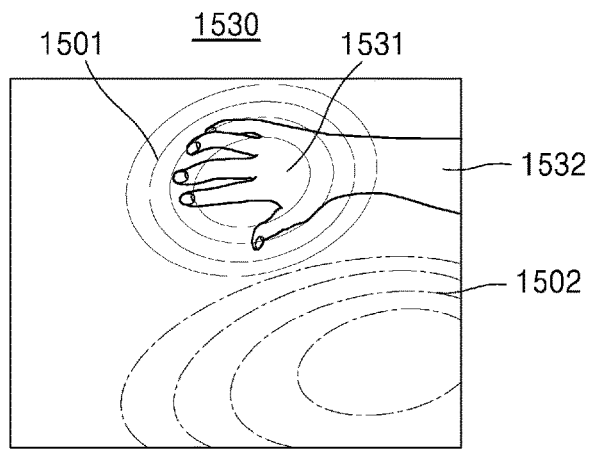
Reject

FIG. 20
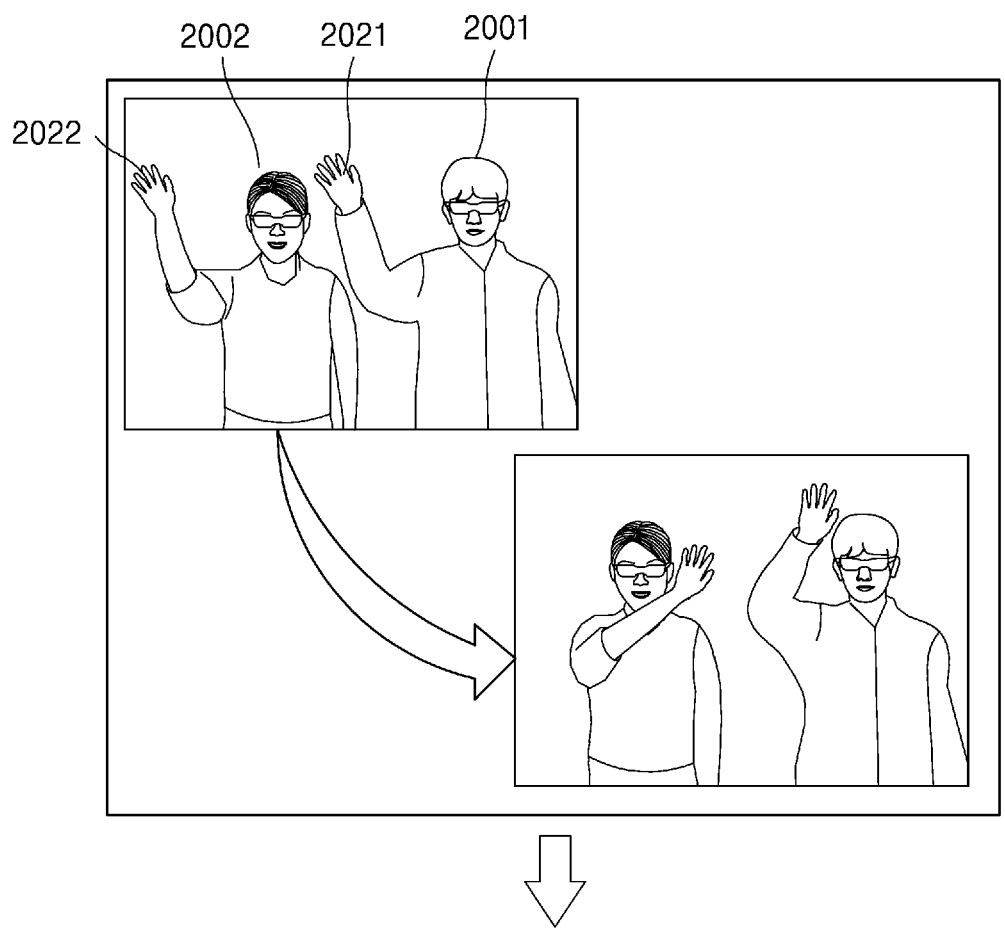
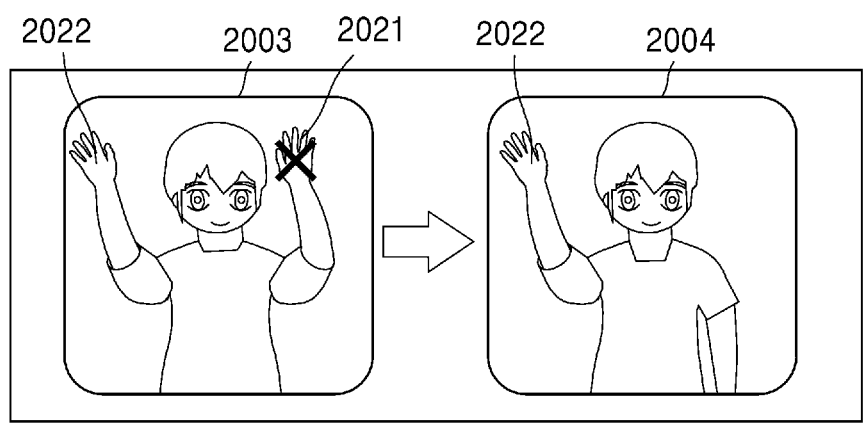

METHOD FOR IDENTIFYING USER'S REAL HAND AND WEARABLE DEVICE THEREFOR

TECHNICAL FIELD

An embodiment of the disclosure relates to a method and system for identifying a hand of a genuine user wearing a wearable device.

BACKGROUND ART

Research on augmented reality began with the development of a first see-through head mounted device (HMD) by Van Sutherland in the 1960s, and was fueled by the advent of the new term 'Augmented Reality (AR)' introduced by Boeing Co., in the early 1990s.

AR platforms are evolving from desktop computers to smartphones. For AR realized based on early personal computers (PCs), with the distribution of personal digital assistants (PDAs), ultra mobile personal computers (UMPCs), mobile phones, etc., since the 2000s, mobile AR platforms have started to be diversified, and after earnest use of smartphones since 2009, they have showed potential of mobile AR application to the real world. The reason that smartphones take the attention as an AR platform is because a smartphone is equipped with not only a camera but also various compact and light sensors such as a global positioning system (GPS), a compass, a magnetic sensor, an acceleration sensor, a touch sensor, a proximity sensor, an illuminance sensor, a wireless fidelity (Wi-Fi) system, a radio frequency identification (RFID) system, etc., to provide additional information allowing a command or intention of the user apart from the location of the user to be figured out.

The AR platform continues to evolve into a type of glasses to cope with a disadvantage of having to hold the smartphone in the user's hand to check information. Simultaneously, with the advance in essential technologies such as Internet of things (IoT), computer vision, realistic content, artificial intelligence (AI), etc., expectations are growing over the potential of various applications.

DESCRIPTION OF EMBODIMENTS

Solution to Problem

An embodiment is for a wearable device to distinguish a hand of a genuine user wearing the wearable device from a hand of someone else to prevent inadvertent or intended manipulation of a third party.

Another embodiment is to provide notification information indicating whether a hand of a genuine user wearing a wearable device is within a detection area of the wearable device, allowing the genuine user to easily recognize a manipulation range of the wearable device.

According to an embodiment, a method of identifying a hand of a genuine user wearing a wearable device includes using a sensor included in the wearable device to recognize a hand located in a detection area of the sensor; estimating a position of a shoulder connected to the hand based on a positional relation between an orientation of the hand and at least one body part connected to the hand; and determining whether the recognized hand is a hand of the genuine user based on information about a probability of a shoulder of the genuine user being present in the estimated position to.

According to an embodiment, a wearable device comprises an outputter; at least one sensor; a memory storing one or more instructions; and a processor connected to the memory and configured to execute the one or more instructions to perform operations of: recognizing a hand located in a detection area of the at least one sensor by using the at least one sensor; estimating a position of a shoulder connected to the hand based on a positional relation between an orientation of the hand coming into the detection area of the at least one sensor and at least one body part connected to the hand; and determining whether the recognized hand is a hand of the genuine user based on information about a probability of a shoulder of the genuine user wearing a wearable device being present in the estimated position.

According to an embodiment, a method of identifying a hand of a genuine user wearing a wearable device includes using a sensor included in the wearable device to recognize a hand located in a detection area of the sensor; determining whether the recognized hand is the hand of the genuine user based on information about a probability that the hand of the genuine user is detected at each position in the detection area; identifying a gesture of the recognized hand when the recognized hand is determined to be a hand of the genuine user; and performing an instruction corresponding to the identified gesture.

According to an embodiment, a wearable device comprises an outputter; at least one sensor; a memory storing one or more instructions; and a processor connected to the memory and configured to execute the one or more instructions to perform operations of: recognizing a hand located in a detection area of the at least one sensor by using the at least one sensor; determining whether the recognized hand is a hand of a genuine user wearing a wearable device based on information about a probability of the hand of the genuine user being detected at each position in the detection area; identifying a gesture of the recognized hand, when the recognized hand is determined to be the hand of the genuine user; and performing an instruction corresponding to the identified gesture.

According to an embodiment, a computer program product includes a recording medium having a program stored thereon to perform operations of: recognizing a hand located in a detection area of at least one sensor by using the at least one sensor; estimating a position of a shoulder connected to the hand based on a positional relation between an orientation of the hand and at least one body part connected to the hand; and determining whether the recognized hand is the hand of the genuine user based on information about a probability of a shoulder of the genuine user being present in the estimated position.

BRIEF DESCRIPTION OF DRAWINGS

FIG. 1 is a diagram for describing a system for identifying a hand of a genuine user wearing a wearable device, according to an embodiment.

FIG. 12 is a diagram for describing notification information, according to an embodiment.

FIG. 15 is a diagram for describing a wearable device distinguishing a hand of a genuine user from a hand of someone else, according to an embodiment.

FIGS. 19 and 20 are diagrams for describing an operation of providing an avatar using hand or arm information, according to an embodiment.

MODE OF DISCLOSURE

Figure 2:
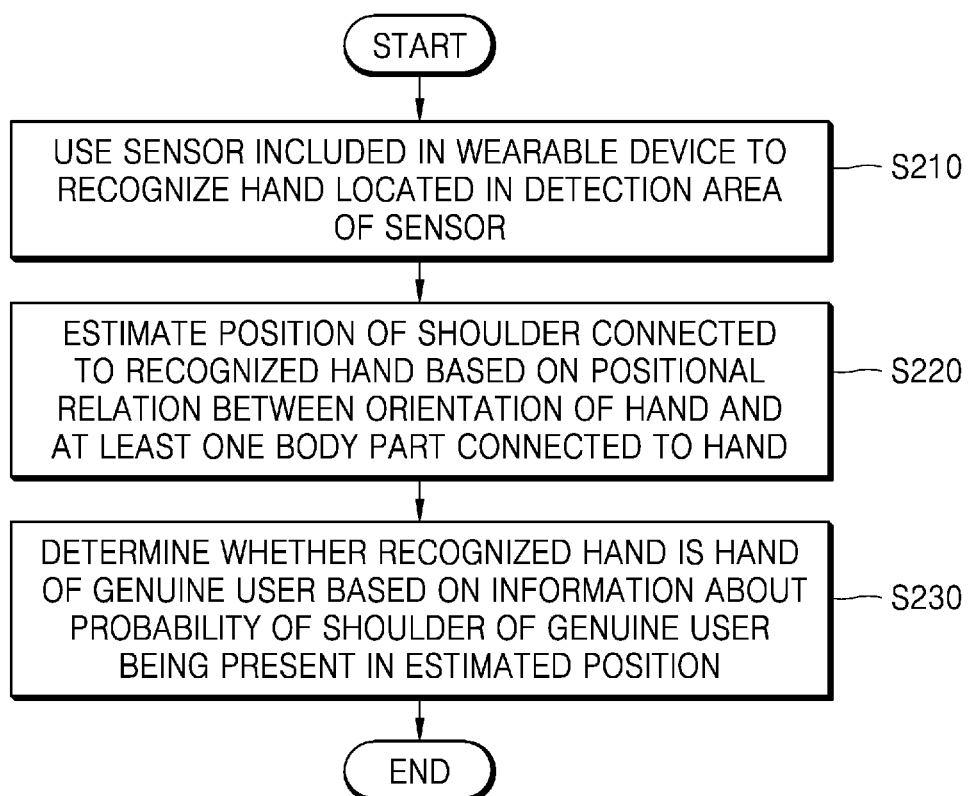
FIG. 2 is a flowchart for describing a method of identifying a hand of a genuine user of a wearable device, according to an embodiment.

Terms as used herein will be described before detailed description of embodiments of the disclosure.

The terms are selected as common terms widely used now, taking into account principles of the disclosure, which may however depend on intentions of ordinary people in the art, judicial precedents, emergence of new technologies, and the like. Some terms as herein used are selected at the applicant's discretion, in which case, description of the disclosure will be explained later in detail. Therefore, the terms should be defined based on their meanings and descriptions throughout the disclosure.

The term "include (or including)" or "comprise (or comprising)" is inclusive or open-ended and does not exclude additional, unrecited elements or method steps. The terms "unit", "module", "block", etc., as used herein each represent a unit for handling at least one function or operation, and may be implemented in hardware, software, or a combination thereof.

Embodiments of the present disclosure will now be described in detail with reference to accompanying drawings to be readily practiced by an ordinary skill in the art. However, the embodiments of the disclosure may be implemented in many different forms, and not limited thereto as will be discussed herein. In the drawings, parts unrelated to the description of the disclosure are omitted for clarity, and like numerals refer to like elements throughout the specification.

FIG. 1 is a diagram for describing a system for identifying a hand of a genuine user wearing a wearable device, according to an embodiment.

In an embodiment, a system for identifying a hand of a genuine user (hereinafter, system) may include a wearable device 1000. However, the system may be implemented with more components than illustrated. For example, the system may further include an external device (e.g., an external server device, a host terminal, etc.). An embodiment of the system further including the external device will be described later in detail with reference to FIG. 18.

In an embodiment, a wearable device 1000 may be a kind of head mounted display (HMD) that may be worn around the head. For example, the wearable device 1000 may include an augmented reality (AR) device or a virtual reality (VR) device, without being limited thereto. The AR device may be a device for providing virtual information about a space and context by showing a virtual object created by computer modeling to overlap a real environment. The VR device may be an HMD capable of filling the entire field of view of the user with a virtual image.

In this specification, the wearable device 1000 is assumed to have the form of glasses for convenience of explanation, but is not limited thereto. For example, the wearable device 1000 may have the form of a helmet, a hat, or an eyepatch, or may have a form that covers only one eye.

In an embodiment, the wearable device 1000 may include a user interface that recognizes gestures of a hand. For example, the wearable device 1000 may perform various instructions according to gestures of the hand. For example, the wearable device 1000 may perform an instruction, e.g., run an application, reproduce content, move, rotate, delete, or copy a virtual object, or transmit content to an external device, according to the gesture of the hand.

In an embodiment, the wearable device 1000 may distinguish a hand of a genuine user (e.g., a first user 10) wearing the wearable device 1000 from the hands of someone else. For example, as shown in FIG. 1, when the first user 10 wears the wearable device and works with a second user 20, the wearable device 1000 of the first user 10 may detect a hand coming into a detection area 100 of the wearable device 1000. In this case, as the first user 10 and the second user 20 work together, a hand coming into the detection area 100 of the wearable device 1000 may be a hand 11 of the first user 10 or a hand 12 of the second user 20. The wearable device 1000 may determine whether the hand coming into the detection area 100 is the hand 11 of the first user 10, and only when the user coming into the detection area 100 is the hand 11 of the first user 10, may recognize a gesture of the hand, thereby preventing the wearable device 1000 from malfunctioning. For example, when the hand coming into the detection area 100 is the hand 12 of the second user 20, the wearable device 1000 may ignore a gesture of the hand 12 of the second user 20.

In this specification, the term 'genuine user' may refer to a user wearing the wearable device 1000. Furthermore, in the specification, the detection area 100 may refer to a field of view (FOV) range of an image sensor equipped in the wearable device 1000 (e.g., a general imaging apparatus, a depth camera, an ultrasonic camera, an infrared camera, a dynamic vision sensor, etc.) or a range of an image obtained by the image sensor.

A method, performed by the wearable device 1000, of identifying a hand of the genuine user to prevent malfunctioning will now be described in detail.

FIG. 2 is a flowchart of a method of identifying a hand of a genuine user of a wearable device, according to an embodiment.

In operation S210, the wearable device 1000 may use a sensor included in the wearable device to recognize a hand located in the detection area 100 of the sensor.

In an embodiment, that the wearable device 1000 recognizes a hand may include obtaining an image that captures the detection area 100 and detecting a hand in the obtained image. In this case, the obtained image may be an image viewed from the genuine user wearing the wearable device 1000, but is not limited thereto.

For example, the wearable device 1000 may use the sensor (e.g., an image sensor) to obtain (e.g., capture) an image including a hand located in the detection area 100 of the sensor. In an embodiment, the image may be a color image (an RGB image) or a black and white image. Furthermore, the image may be a three dimensional (3D) image or a two dimensional (2D) image; a moving image or a still image, without being limited thereto. For example, the image may be at least one of an ultrasound image, an infrared image, or a dynamic vision sensor image.

In an embodiment, the wearable device 1000 may use predefined template images of hands to recognize a hand located in the detection area 100. For example, the wearable device 1000 may detect whether a hand is located in the detection area 100 by comparing the predefined template images of hands to the image obtained by capturing the detection area 100. Furthermore, the wearable device 1000 may use the predefined template images of hands to determine whether the hand located in the detection area 100 is a right hand or a left hand.

In an embodiment, the wearable device 1000 may use a machine learning model (or referred to as an artificial intelligence (AI) model) to recognize a hand located in the detection area 100. For example, the wearable device 1000 may use a deep neural network (DNN) model that learns images of various hands to recognize a hand in the detection area 100. When the wearable device 1000 inputs an image that captures the detection area 100 to the machine learning model (e.g., DNN), the machine learning model may detect a form of the hand in the input image.

In operation S220, the wearable device 1000 may estimate a position of a shoulder connected to the recognized hand, based on a positional relation between the orientation of the recognized hand and at least one body part connected to the recognized hand.

In an embodiment, the wearable device 1000 may detect a hand in the image that captures the detection area 100, and further detect at least one body part connected to the detected hand in the image that captures the detection area 100. The at least one body part connected to the hand may include at least one of a wrist, a forearm, an elbow, or an upper arm, but is not limited thereto. In this case, the wearable device 1000 may finally estimate a position of a shoulder connected to the detected hand, based on a positional relation between the detected hand and the at least one body part connected to the hand.

Figure 3:
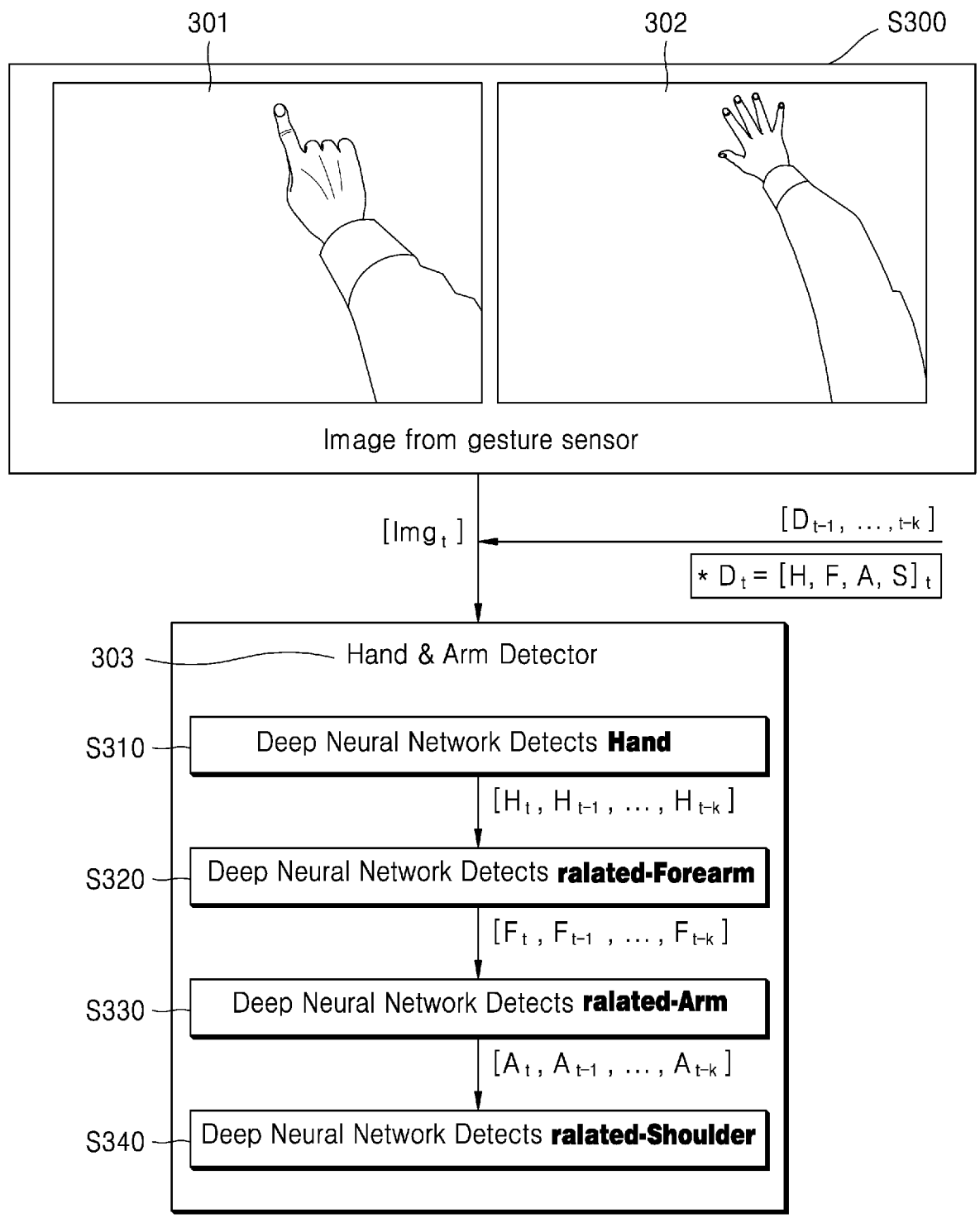
FIG. 3 is a flowchart for describing a method of detecting a hand and at least one body part connected to the hand, according to an embodiment.

For example, referring to FIG. 3, the wearable device 1000 may use an image sensor (e.g., a gesture sensor) to obtain an image of the detection area 100, in operation S300. For example, the wearable device 1000 may obtain a first image 301 and a second image 302. In this case, the wearable device 1000 may use a hand and arm detector 303 to detect a hand (e.g., orientation of a hand) or at least one body part connected to the hand from each of the first image 301 and the second image 302. For example, in operation S310, the wearable device 1000 may use a machine learning model (e.g., DNN) to perform an operation of detecting a hand from each of the first image 301 and the second image 302. In this case, the wearable device 1000 may determine the orientation of the hand or whether the detected hand is a right hand or a left hand. For example, the wearable device 1000 may determine from the first image 301 and the second image 302 that the orientation of the hand is north-northwest and the detected hand is a right hand. In operation S320, the wearable device 1000 may use a machine learning model (e.g., DNN) to perform an operation of detecting a forearm connected to the hand from each of the first image 301 and the second image 302. In operation S330, the wearable device 1000 may use a machine learning model (e.g., DNN) to perform an operation of detecting an upper arm connected to the forearm from each of the first image 301 and the second image 302. In operation S340, the wearable device 1000 may use a machine learning model (e.g., DNN) to perform an operation of detecting a shoulder connected to the upper arm from each of the first image 301 and the second image 302. Operations S310 to S340 of FIG. 3 may be performed sequentially or simultaneously.

Figure 4:
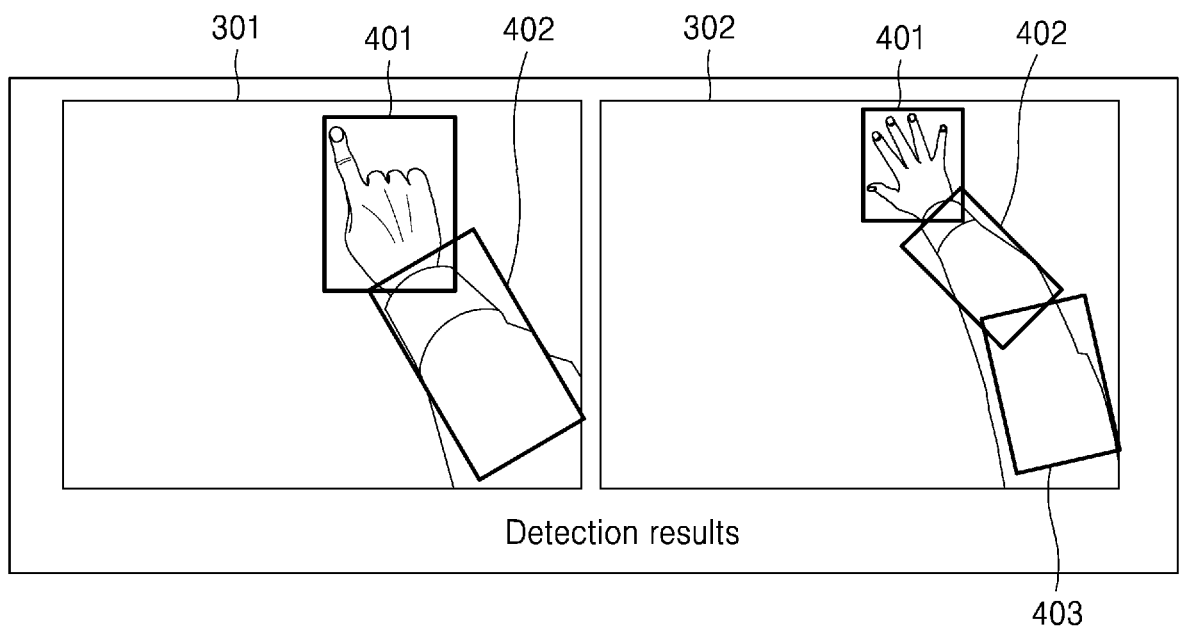
FIG. 4 is a diagram for describing a result of detection from an image, according to an embodiment.

Referring to FIG. 4, as a result of performing operations S310 to S340 by the wearable device 1000, a hand 401 and a forearm 402 may be detected from the first image 301, and the hand 401, the forearm 402 and an upper arm 403 may be detected from the second image 302. In this case, the wearable device 1000 may estimate a position of a shoulder based on the orientation of the detected hand and positional relations between the detected body parts. For example, the wearable device 1000 may estimate a position of the upper arm 403 connected to the forearm 402 and a position of a shoulder, based on orientation of the hand 401 and a positional relation between the hand 401 and the forearm 402 detected in the first image 301. Furthermore, the wearable device 1000 may estimate a position of a shoulder connected to the upper arm 403 based on positional relations between the hand 401, the forearm 402 and the upper arm 403 detected in the second image 302.

Figure 5:
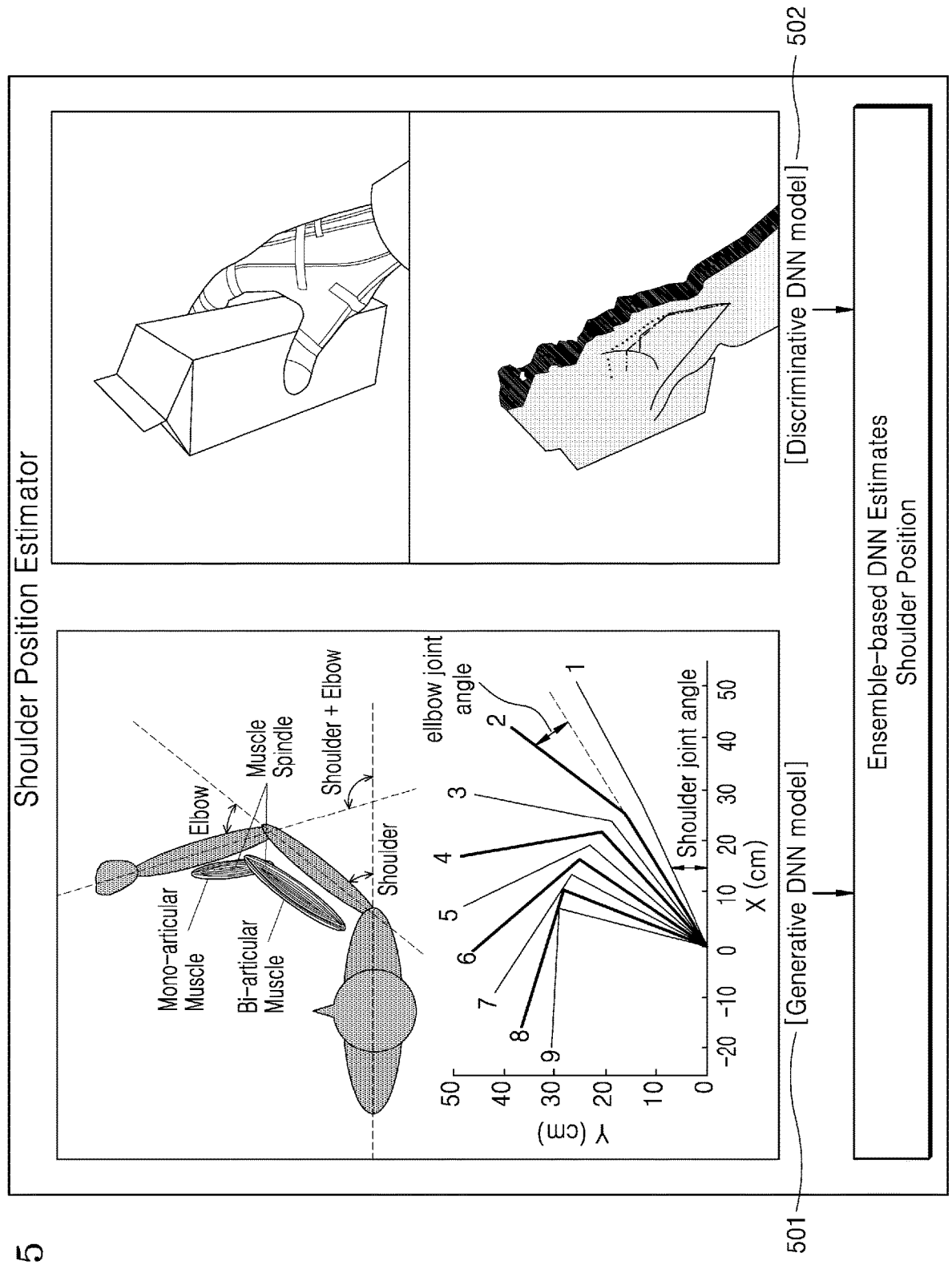
FIG. 5 is a diagram for describing a machine learning model for estimating a shoulder position, according to an embodiment.

Referring to FIG. 5, the wearable device 1000 may use a machine learning model to estimate a position of a shoulder connected to the hand detected in the first image 301 or the second image 302. For example, the wearable device 1000 may estimate a position of a shoulder connected to a hand by using a generative DNN model 501 or a discriminative DNN model 502. The generative DNN model 501 may refer to a machine learning model to find a result value from input data according to a particular mathematical expression or rule, and the discriminative DNN model 502 may refer to a machine learning model to find a result value from comparison between input data and an existing database.

In an embodiment, when the wearable device 1000 inputs the first image 301 to the generative DNN model 501, the generative DNN model 501 may estimate a position of an upper arm based on a rule between an angle between the hand 401 and the forearm 402 detected from the first image 301 and a position of the upper arm. The generative DNN model 501 may also use a rule between angles between the hand 401, the forearm 402 detected from the first image 301, and an upper arm at the estimated position, and a position of a shoulder, to estimate a position of the shoulder.

In an embodiment, when the wearable device 1000 inputs the second image 302 to the discriminative DNN model 502, the discriminative DNN model 502 may estimate a position of a shoulder by finding an image having similar data to positions of the hand 401, the forearm 402 and the upper arm 403 detected from the second image 302 from among images in the database.

In an embodiment, when a shoulder is included in an image of the detection area 100 obtained by the image sensor, the wearable device 1000 may directly estimate the position of the shoulder by analyzing the image of the detection area 100. An occasion when no shoulder is included in the image of the detection area 100 will now be described for convenience of explanation.

In operation S230, the wearable device 1000 may use information about a probability of a shoulder of the genuine user being present at the estimated shoulder position to determine whether the recognized hand is a hand of the genuine user.

In an embodiment, the wearable device 1000 may obtain the information about the probability of a shoulder of the genuine user being present. The information about the probability of a shoulder of the genuine user being present may include probability values that a shoulder of the genuine user may be actually present on 3D spatial coordinates with respect to the wearable device 1000 (or the head of the genuine user). The information about the probability of a shoulder of the genuine user being present may be represented with a set of probability values or by a probability distribution chart, without being limited thereto.

Figure 6:
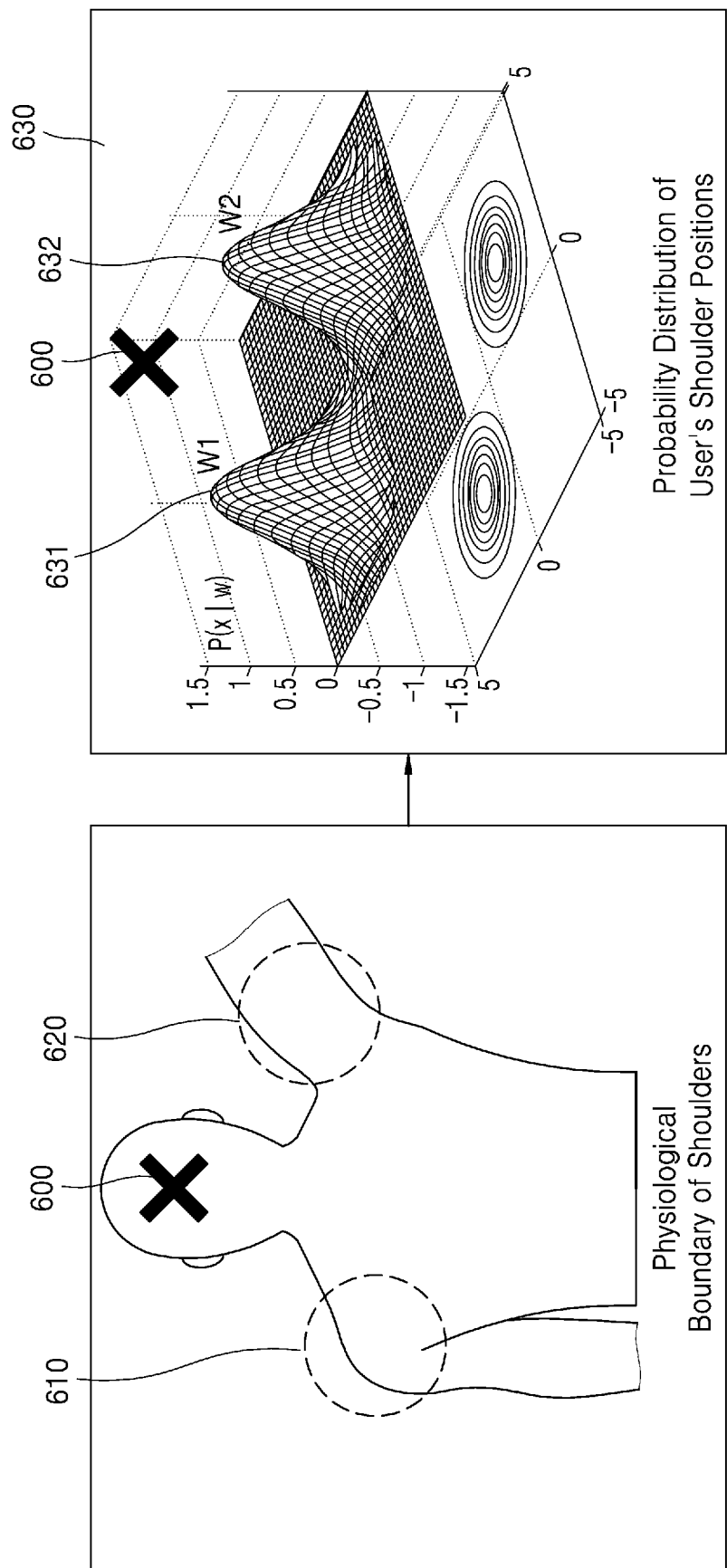
FIG. 6 is a diagram for describing information about a probability of a shoulder of a genuine user being present, according to an embodiment.

The information about the probability of a shoulder of the genuine user being present may include information about a probability of the right shoulder being present and information about the probability of the left shoulder being present. For example, referring to FIG. 6, assuming that the center of the wearable device 1000 or the center of the head of the genuine user is a reference point 600, a probability distribution chart of the left shoulder 610 of the genuine user being present may be represented as in a first graph 631, and a probability distribution chart of the right shoulder 620 of the genuine user being present may be represented as in a second graph 632. In this case, information about the probability of a shoulder of the genuine user being present 630 may include the first graph 631 and the second graph 632.

In an embodiment, the wearable device 1000 may obtain a probability value in an estimated shoulder position from the information about the probability of a shoulder of the genuine user being present. The wearable device 1000 may determine that a hand recognized in the detection area 100 is the hand of the genuine user, when the probability value in the estimated shoulder position is greater than a threshold (e.g., 95%).

Figure 7:
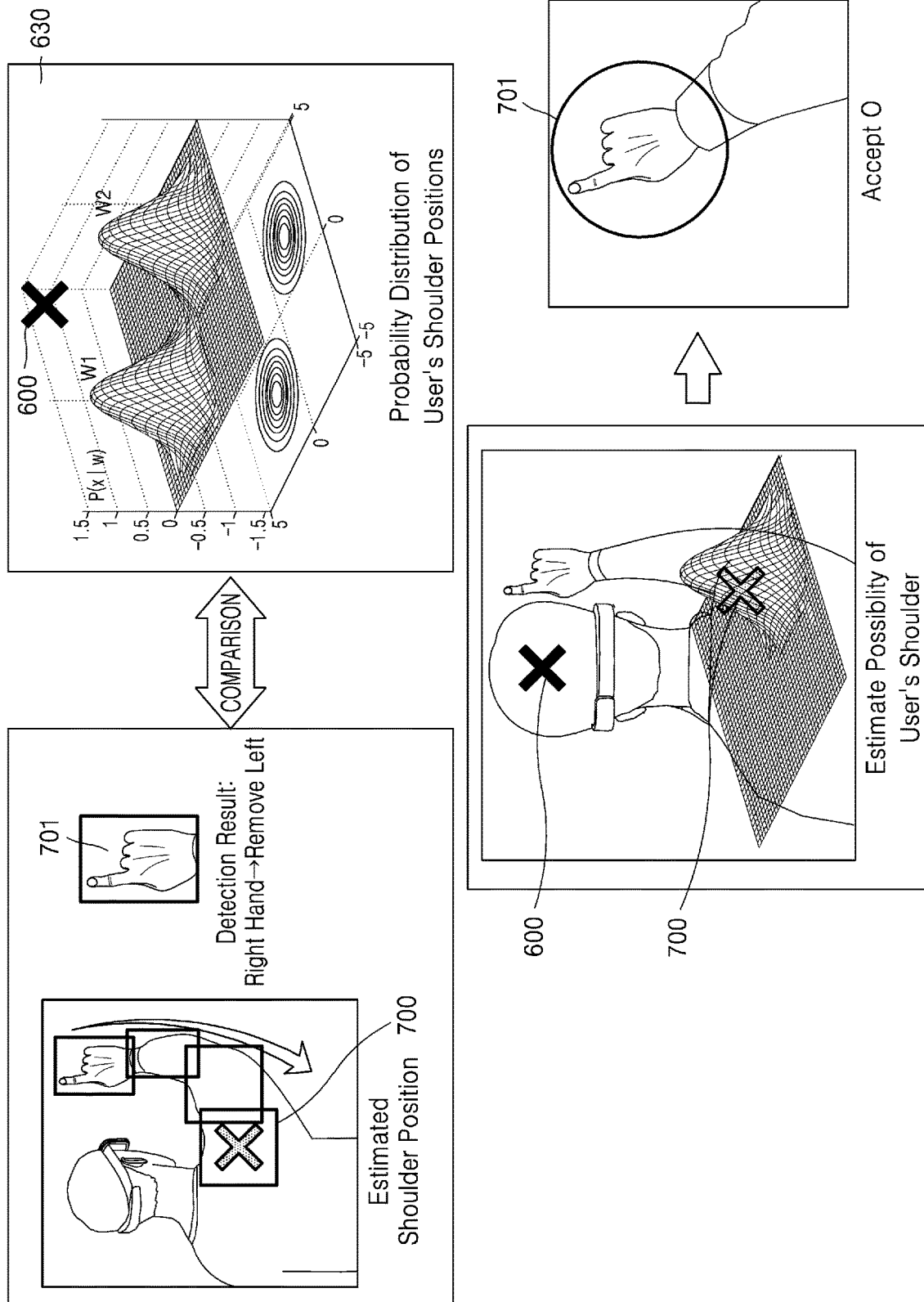
FIG. 7 is a diagram for describing a wearable device determining a hand of a genuine user, according to an embodiment.

For example, referring to FIG. 7, the wearable device 1000 may detect a hand 701 from an image of the detection area 100, and estimate a position of a forearm connected to the detected hand 701, a position of an upper arm connected to the forearm, and a position of a shoulder 700 connected to the upper hand by using a machine learning model (e.g., the generative DNN model 501 or the discriminative DNN model 502).

In this case, the wearable device 1000 may obtain a probability value of the shoulder of the genuine user being present in the estimated shoulder position 700 by comparing the information about the probability of a shoulder of the genuine user being present 630 with the estimated shoulder position 700. In an embodiment, as the detected hand 701 is a right hand, the wearable device 1000 may obtain a probability value of the right shoulder of the genuine user being present in the estimated position 700. When the probability value of the right shoulder of the genuine user being present in the estimated position 700 is equal to or greater than a threshold (e.g., 90%), the wearable device 1000 may determine that the detected hand 701 is a hand of the genuine user.

On the other hand, when the probability value of a shoulder of the genuine user being present in the estimated position is less than a threshold (e.g., 90%), the wearable device 1000 may determine that the detected hand is a hand of someone else.

In an embodiment, the wearable device 1000 may obtain a probability distribution (or pattern) of the shoulder of the genuine user being present in the estimated shoulder position 700 by comparing the information about the probability of a shoulder of the genuine user being present 630 with the estimated shoulder position 700. For example, as the detected hand 701 is a right hand, the wearable device 1000 may obtain a probability distribution (or pattern) of the right shoulder of the genuine user being present in the estimated position 700. Using the probability distribution (or pattern) of the right shoulder of the genuine user being present in the estimated position 700, the wearable device 1000 may determine that the detected hand 701 is a hand of the genuine user. For example, when the probability distribution (or pattern) of the right shoulder of the genuine user being present in the estimated position 700 is equal to or greater than a reference distribution (or pattern), the wearable device 1000 may determine that the detected hand 701 is a hand of the genuine user.

Figure 8:
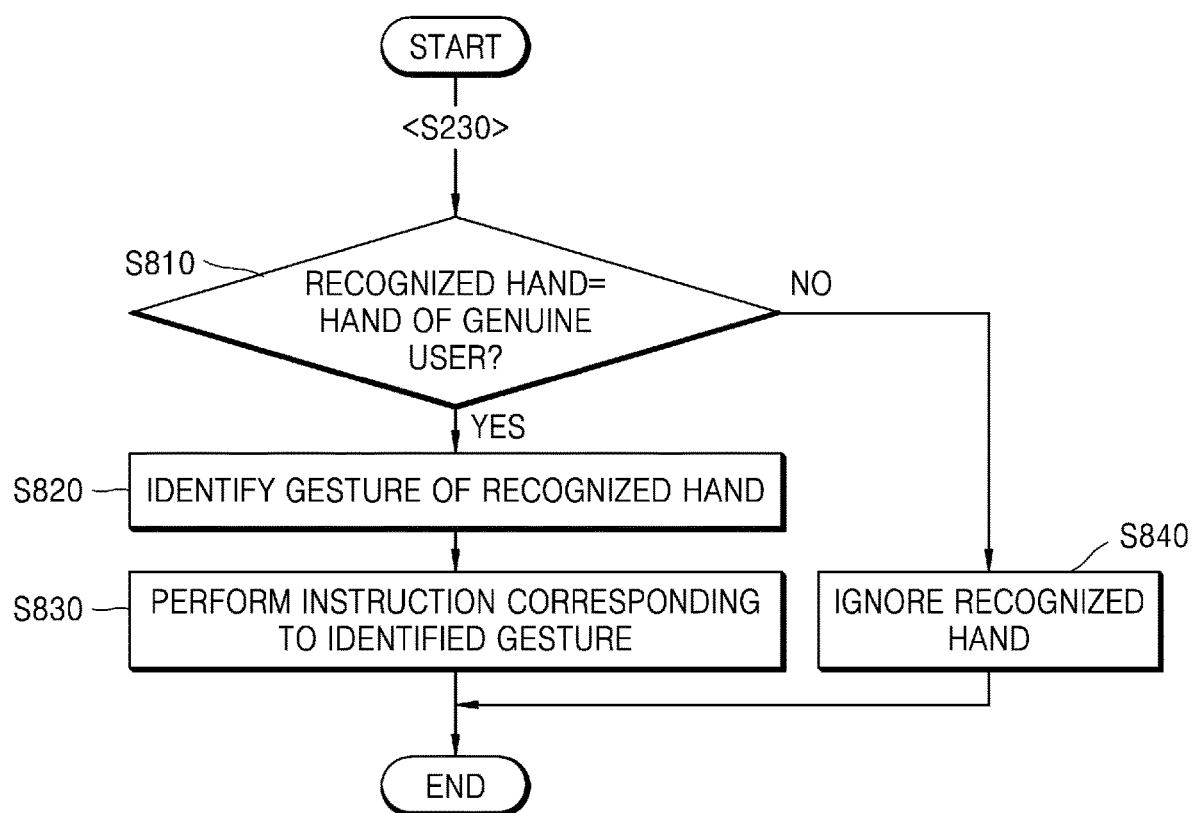
FIG. 8 is a flowchart for describing a method of identifying a gesture of a hand of a genuine user, according to an embodiment.

FIG. 8 is a flowchart of a method of identifying a gesture of a hand of a genuine user, according to an embodiment.

In operations S810 and S820, the wearable device 1000 may identify a gesture of a recognized hand when the recognized hand is determined to be a hand of the genuine user.

In an embodiment, the wearable device 1000 may identify a gesture of the recognized hand by comparing a movement of the hand detected in the image of the detection area 100 with a predefined hand movement in a database. For example, different gestures may be identified according to the overall form of the hand, the number or a type of folded fingers, a direction in which the hand is moving, a direction to which an unfolded finger points, etc. For example, the wearable device 1000 may identify a swiping gesture, a dragging gesture, a pinching gesture, a touching gesture, a double-clicking gesture, a clenching gesture, etc., without being limited thereto.

In an embodiment, the wearable device 1000 may use a machine learning model (e.g., a DNN) to identify a gesture of a hand included in the image of the detection area 100. For example, when the wearable device 1000 inputs the image of the detection area 100 to the machine learning model, the machine learning model may output an instruction corresponding to a gesture of the hand included in the image of the detection area 100 as a result value.

In operation S830, the wearable device 1000 may perform an instruction corresponding to an identified gesture.

In an embodiment, the wearable device 1000 may perform an instruction corresponding to the gesture based on a table that maps between gestures and instructions. For example, instructions corresponding to gestures may include an instruction to select particular content, an instruction to run a particular application, an instruction to manipulate a virtual object (e.g., an instruction to scale a virtual object up or down, an instruction to move a virtual object, an instruction to copy a virtual object, an instruction to delete a virtual object, etc.), an instruction to control power to the wearable device 1000, an instruction to transmit or receive data to or from an external device, etc., without being limited thereto.

In operations S810 and S840, when determining that the recognized hand is not a hand of the genuine user, the wearable device 1000 may ignore the recognized hand.

For example, the wearable device 1000 may not identify a gesture of the recognized hand when it is determined that the recognized hand is not a hand of the genuine user.

Although a case that the wearable device 1000 operates according to a gesture of the genuine user is described in FIG. 8 as an example, the disclosure is not limited thereto. In an embodiment, the wearable device 1000 may perform an operation corresponding to a voice command of the genuine user, according to the voice command. For example, the wearable device 1000 may identify a feature of the voice of the genuine user, and perform the voice command only when a feature of the received voice corresponds to the feature of the voice of the genuine user.

Figure 9:
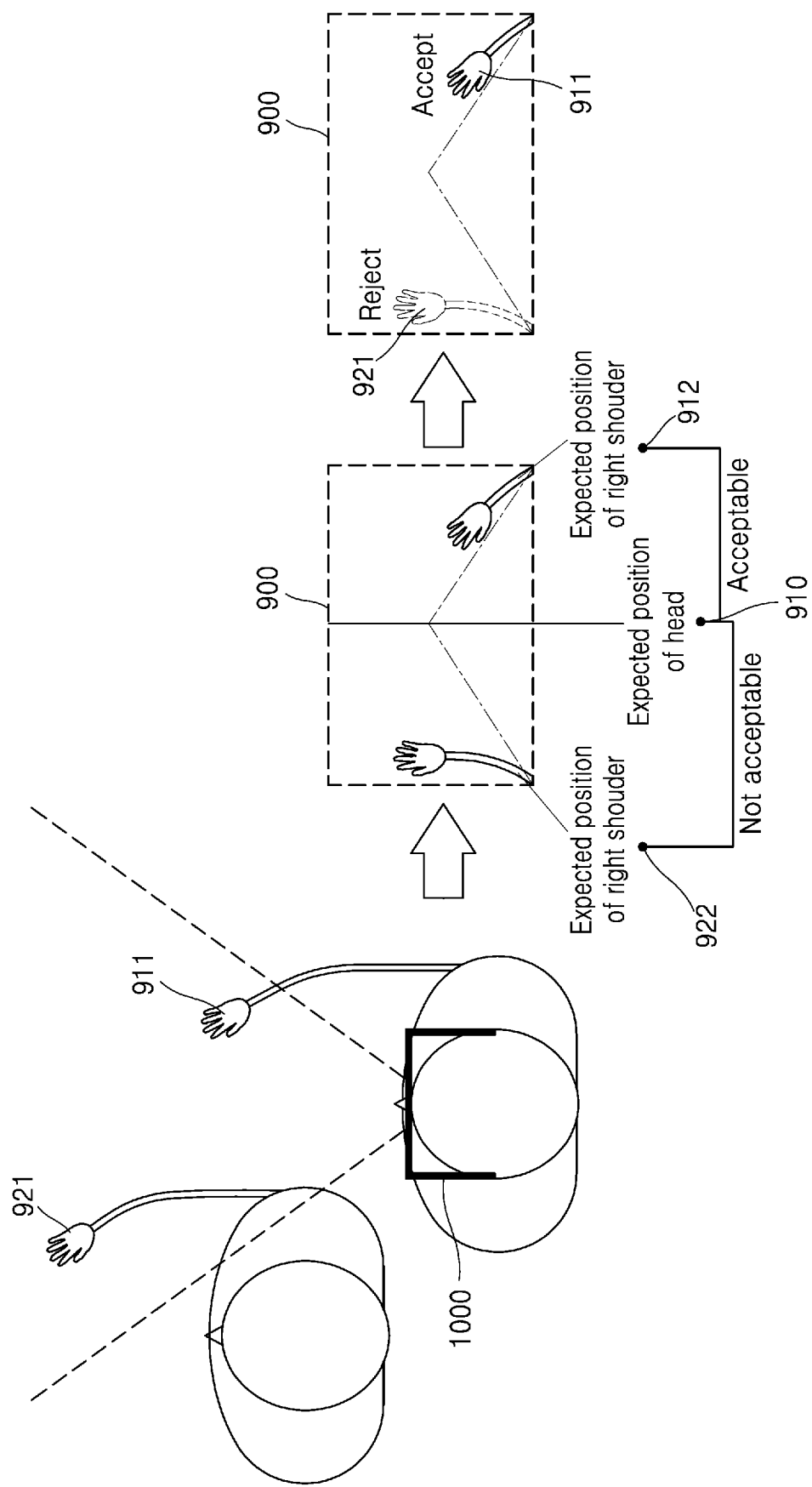
FIG. 9 is a diagram for describing a wearable device ignoring a hand of someone else, according to an embodiment.

FIG. 9 is a diagram for describing a wearable device ignoring a hand of someone else, according to an embodiment.

Referring to FIG. 9, the wearable device 1000 may recognize a first hand 911 and a second hand 921 in the detection area 100. For example, the wearable device 1000 may obtain an image 900 of the detection area 100 including the first hand 911 and the second hand 921. The wearable device 1000 may detect the first hand 911 in the image 900 and estimate a first position 912 of a first shoulder connected to the first hand 911. The wearable device 1000 may also detect the second hand 921 in the image 900 and estimate a second position 922 of a second shoulder connected to the second hand 921.

In this case, as both the first hand 911 and the second hand 921 are right hands, the wearable device 1000 may take the head of the genuine user wearing the wearable device 1000 as a reference point 910 to obtain information about a probability of the right shoulder of the genuine user being present.

The wearable device 1000 may extract a first probability value for the first position 912 and a second probability value for the second position 922 from the information about the probability of the right shoulder of the genuine user being present. For example, the probability value of the right shoulder of the genuine user being present in the first position 912 may be 99%, and the probability value of the right shoulder of the genuine user being present in the second position 922 may be 0%. In this case, the wearable device 1000 may determine that the first hand 911 is a hand of the genuine user and the second hand 921 is not a hand of the genuine user. Accordingly, the wearable device 1000 may react only to a gesture of the first hand 911 but may ignore a gesture of the second hand 921.

Figure 10:
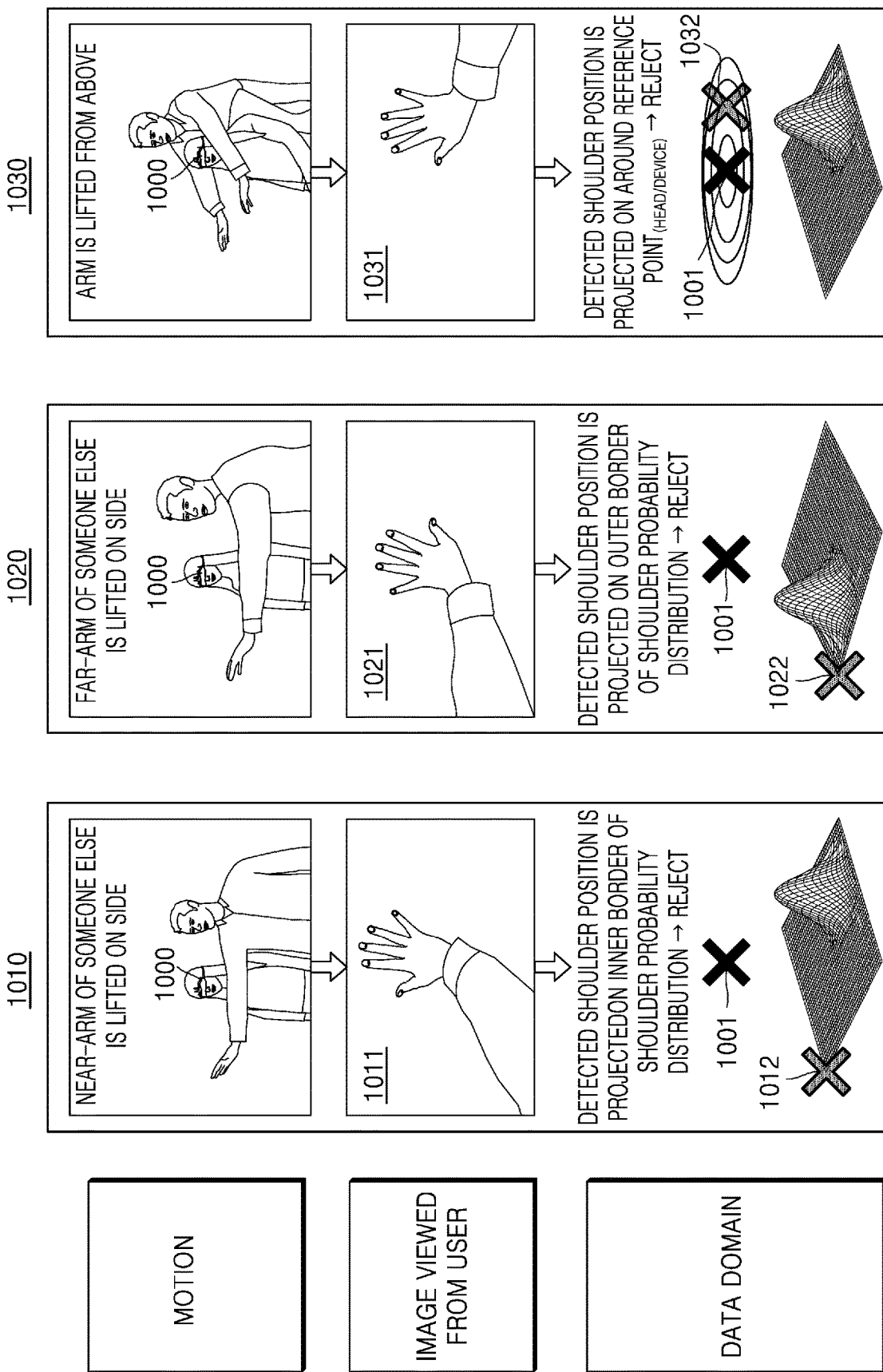
FIG. 10 is a diagram for describing a wearable device detecting a hand of someone else, according to an embodiment.

FIG. 10 is a diagram for describing a wearable device detecting a hand of someone else, according to an embodiment.

Referring to a first embodiment 1010 of FIG. 10, a first right hand of someone else may come into the detection area 100 of the wearable device 1000 while the someone is standing on the left of the genuine user. In this case, the wearable device 1000 may obtain a first image 1011 of the detection area 100 and detect the first right hand from the first image 1011. The wearable device 1000 may estimate a position of a first shoulder 1012 connected to the first right hand, and identify a first probability value of the right shoulder of the genuine user being present in the estimated position 1012 by comparing the estimated position of the first shoulder 1012 with information about a probability of a shoulder of the genuine user being present. In this case, as the first probability value is 0.00001%, the wearable device 1000 may determine that the first right hand is a hand of someone else and ignore a gesture of the first right hand.

Referring to a second embodiment 1020 of FIG. 10, a second left hand of someone else may come into the detection area 100 of the wearable device 1000 while that other person is standing on the left of the genuine user. In this case, the wearable device 1000 may obtain a second image 1021 of the detection area 100 and detect the second left hand from the second image 1021. The wearable device 1000 may estimate a position of a second shoulder 1022 connected to the second left hand, and identify a second probability value of the left shoulder of the genuine user being present in the estimated position 1022 by comparing the estimated position of the second shoulder 1022 with the information about a probability of a shoulder of the genuine user being present. In this case, as the second probability value is 0%, the wearable device 1000 may determine that the second left hand is a hand of someone else and ignore a gesture of the second left hand.

Referring to a third embodiment 1030 of FIG. 10, when someone is stretching his/her arms from over the shoulders of the genuine user, a third right hand of that other person may come into the detection area 100 of the wearable device 1000. In this case, the wearable device 1000 may obtain a third image 1031 of the detection area 100 and detect the third right hand from the third image 1031. The wearable device 1000 may estimate a position of a third shoulder 1032 connected to the third right hand, and identify a third probability value of the right shoulder of the genuine user being present in the estimated position 1032 by comparing the estimated position of the third shoulder 1032 with information about a probability of a shoulder of the genuine user being present. The third probability value may be 0% because the estimated position of the third shoulder 1032 is at the same level as the reference point 100 (e.g., the center of the head of the genuine user). Accordingly, the wearable device 1000 may determine that the third right hand is a hand of someone else and ignore a gesture of the third right hand.

Figure 11:
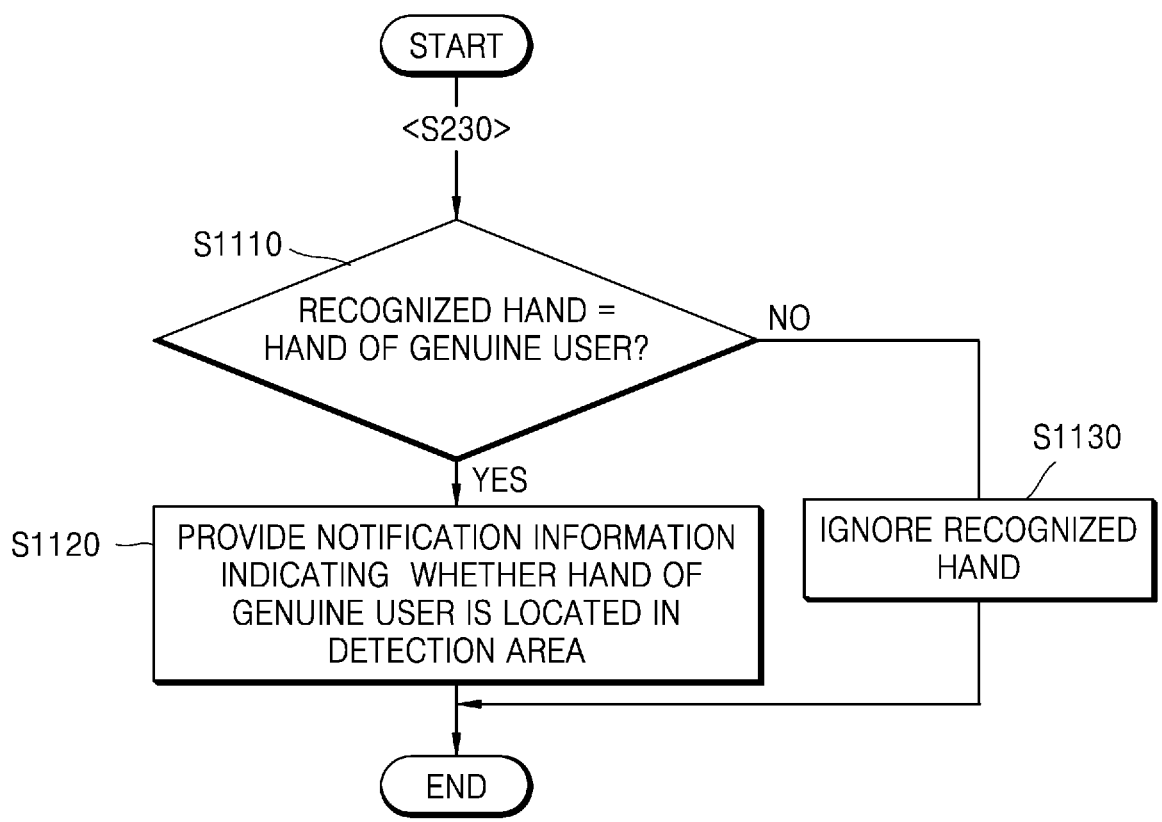
FIG. 11 is a flowchart for describing a method of providing notification information indicating whether a hand of a genuine user is located in a detection area, according to an embodiment.

FIG. 11 is a flowchart of a method of providing notification information indicating whether a hand of a genuine user is located in a detection area, according to an embodiment.

In operations S1110 and S1120, the wearable device 1000 may provide notification information indicating whether a hand of the genuine user is located in the detection area, when the recognized hand is determined to be a hand of the genuine user. In an embodiment, the wearable device 1000 may provide the notification information by using at least one of a visual signal, an audible signal, and a vibration signal.

For example, when a hand of the genuine user is coming into the detection area 100, the wearable device 1000 may notify the genuine user that a hand of the genuine user is within the detection area 100 by displaying a first identification image in a display area provided by the wearable device 1000. In this case, as the genuine user may be aware that his/her hand is within the detection area 100, the genuine user may freely manipulate the wearable device 1000 by using gestures of the hand.

When the hand of the genuine user deviates from the detection area 100, the wearable device 1000 may notify the genuine user that the hand of the genuine user has disappeared from the detection area 100 by displaying a second identification image in the display area of the wearable device 1000. This may prevent the genuine user from mistaking his/her hand being in the detection area 100, and guide the genuine user to move his/her hand back into the detection area 100 to manipulate the wearable device 1000 with a gesture of the hand of the genuine user.

In an embodiment, the first identification image and the second identification image may be images predefined by the user or a system, and may be changed by manipulation of the user. For example, the first identification image may be a first animation with edges of the display area turning blue, and the second identification image may be a second animation with edges of the display area turning red. Alternately, the first identification image may be an image with a hand icon drawn within a circle, and the second identification image may be an image with an X mark overlapping on a hand icon. There may be various kinds of first and second identification images.

When a hand of the genuine user is coming into the detection area 100, the wearable device 1000 may notify the genuine user that the hand of the genuine user is within the detection area 100 by outputting a first sound (e.g., a first song, a first voice comment 'a hand is detected', etc.). On the other hand, when the hand of the genuine user deviates from the detection area 100, the wearable device 1000 may notify the genuine user that the hand of the genuine user has disappeared from the detection area 100 by outputting a second sound (e.g., a second song, a second voice comment 'a hand is not detected', etc.).

In operations S1110 and S1130, when determining that the recognized hand is not a hand of the genuine user, the wearable device 1000 may ignore the recognized hand. Operation S1130 corresponds to operation S840 of FIG. 8, so the detailed description thereof will be omitted.

FIG. 12 is a diagram for describing notification information, according to an embodiment. In FIG. 12, a case that a hand in the detection area 100 is determined as a hand of the genuine user will be described as an example.

Referring to a first embodiment 1210 of FIG. 12, a hand of the genuine user wearing the wearable device 1000 may come into the detection area 100 of the wearable device 1000. In this case, the wearable device 1000 may display a first identification image in a display area 1230 representing that the hand of the genuine user has come into the detection area 100. For example, the wearable device 1000 may display a translucent blue image 1201 in a lower right portion of the display area, from which the hand of the genuine user appears.

Referring to a second embodiment 1220 of FIG. 12, a hand of the genuine user wearing the wearable device 1000 may deviate from the detection area 100 of the wearable device 1000. In this case, the wearable device 1000 may display a second identification image in the display area 1230 representing that the hand is out of the detection area 100. For example, the wearable device 1000 may display a translucent red image 1202 in a lower right portion of the display area 1230, from which the hand of the genuine user disappears.

Figure 13:
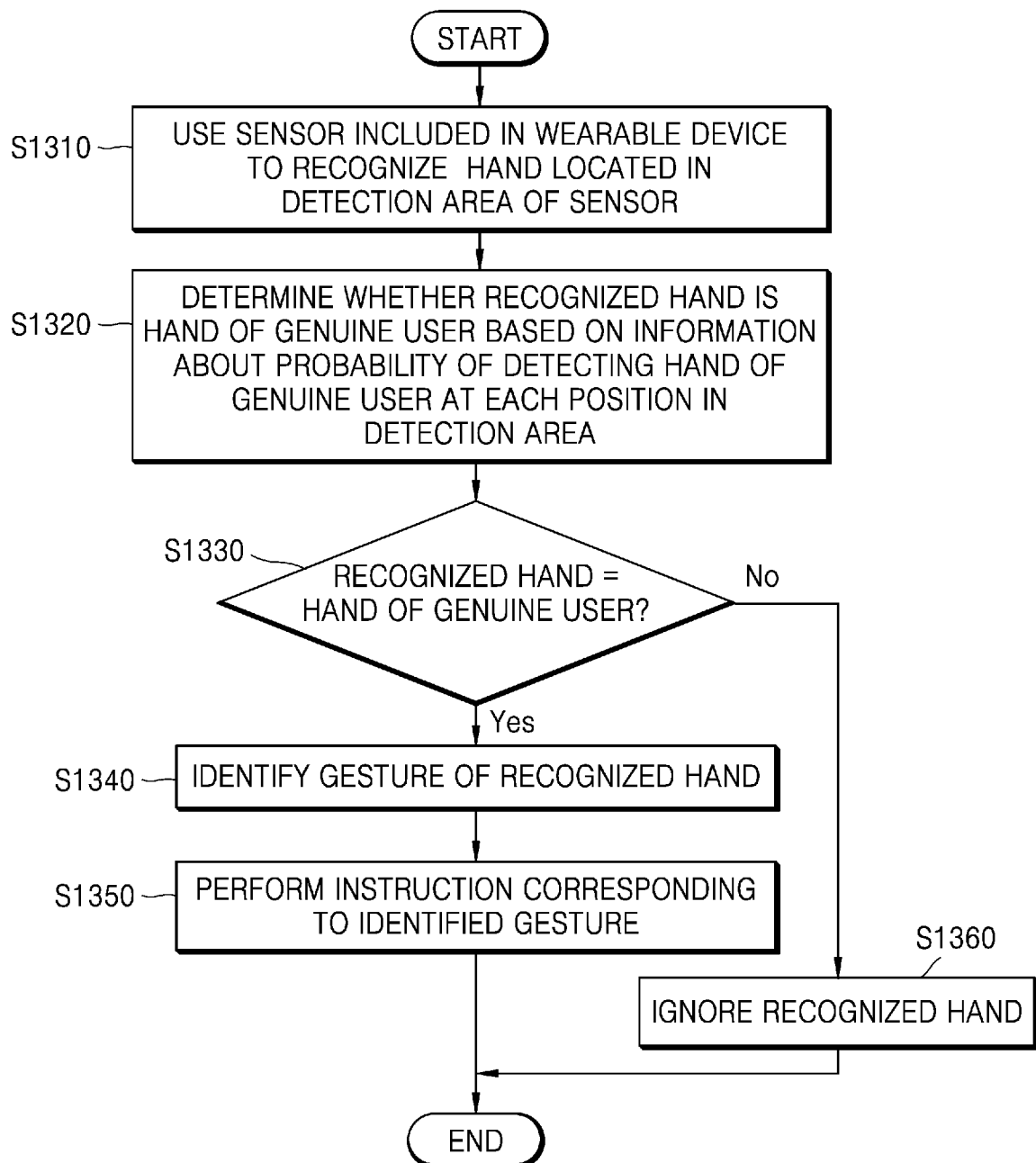
FIG. 13 is a flowchart for describing a method of identifying a hand of a genuine user based on information about a probability of detecting a hand of the genuine user at each position in a detection area, according to an embodiment.

FIG. 13 is a flowchart of a method of identifying a hand of a genuine user based on information about a probability of detecting a hand of the genuine user at each position in a detection area, according to an embodiment.

In operation S1310, the wearable device 1000 may use a sensor included in the wearable device 1000 to recognize a hand located in the detection area 100 of the sensor.

In an embodiment, that the wearable device 1000 recognizes a hand may include obtaining an image that captures the detection area 100 and detecting a hand in the obtained image. In this case, the obtained image may be an image viewed from the genuine user wearing the wearable device 1000, but is not limited thereto.

Operation S1310 corresponds to operation S210 of FIG. 2, so the detailed description thereof will be omitted.

In operation S1320, the wearable device 1000 may determine whether the hand recognized in the detection area 100 is a hand of the genuine user, based on information about a probability that a hand of the genuine user may be detected in each position in the detection area 100.

Figure 14:
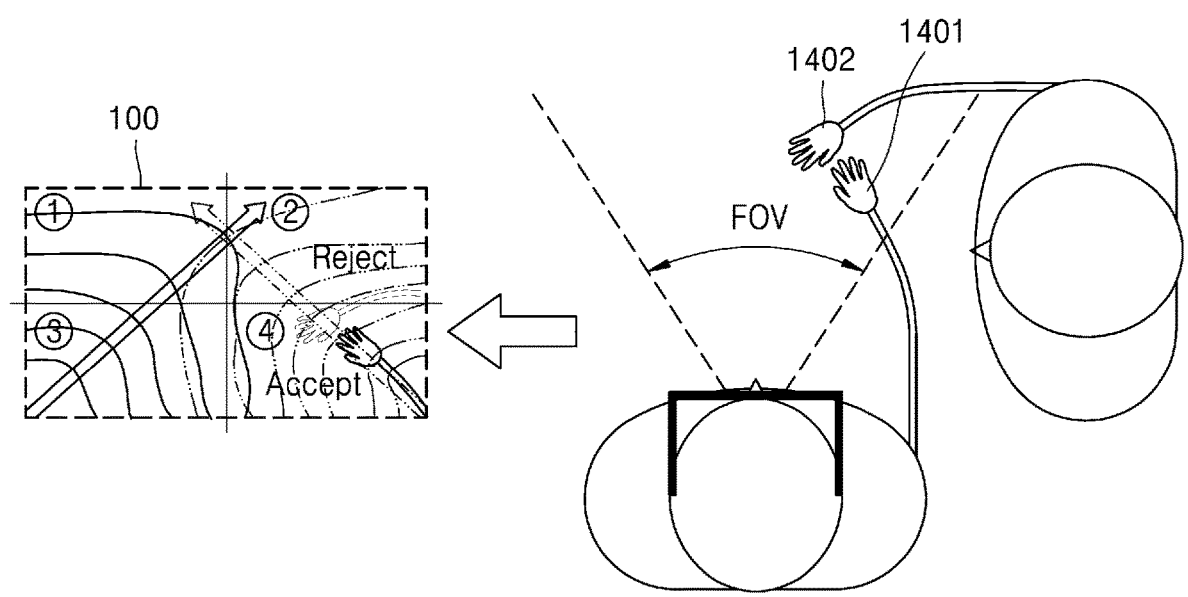
FIG. 14 is a diagram for describing information about a probability of detecting a hand of a genuine user at each position in a detection area, according to an embodiment.

In an embodiment, the information about the probability of detecting a hand of the genuine user may include information about a probability of a direction in which a hand of the genuine user appears in the detection area 100. For example, referring to FIG. 14, when the detection area 100 is divided into four sections, there may be a high probability that the right hand of the genuine user appears in a direction from a fourth quadrant ④ to a first quadrant ①. On the other hand, the left hand of the genuine user may be more likely to appear in a direction from a third quadrant ③ to a second quadrant ②.

Accordingly, when a first right hand 1401 appears in the detection area 100 in the direction from the fourth quadrant ④ to the first quadrant ①, the wearable device 1000 may determine that the first right hand 1401 is the right hand of the genuine user and follow an instruction from the first right hand 1401 in the detection area 100. On the other hand, when a second right hand 1402 appears in the detection area 100 in a direction from the second quadrant ② to the fourth quadrant ④, the wearable device 1000 may determine that the second right hand 1402 is not the right hand of the genuine user and ignore a gesture of the second right hand 1402 in the detection area 100.

In an embodiment, the information about the probability of detecting a hand of the genuine user may include probability information about positions in which, based on a hand in the detection area 100, body parts connected to the hand may exist.

For example, referring to a first image 1510 capturing the detection area 100 of FIG. 15, when a first hand 1511 and a first forearm 1512 connected to the first hand 1511 are detected in the first image 1510, the wearable device 1000 may obtain a first probability distribution 1501 of positions where a hand of the genuine user may be present in the first image 1510 and a second probability distribution 1502 of positions where a forearm connected to a hand of the genuine user may be present in the first image 1510, based on the position of the first hand 1511. Using the first probability distribution 1501 and the second probability distribution 1502, the wearable device 1000 may determine whether the first hand 1511 is a hand of the genuine user. For example, when a probability that a forearm of the genuine user is present in the position of the first forearm 1512 is 99% based on a result of comparing the position of the first forearm 1512 connected to the first hand 1511 with the second probability distribution 1502, the wearable device 1000 may determine that the first hand 1511 is a hand of the genuine user.

Furthermore, referring to a second image 1520 capturing the detection area 100, when a second hand 1521, a second forearm 1522 connected to the second hand 1521, and a second upper arm 1523 connected to the second forearm 1522 are detected in the second image 1520, the wearable device 1000 may obtain the first probability distribution 1501 of positions where a hand of the genuine user may be present in the second image 1520, the second probability distribution 1502 of positions where a forearm connected to a hand of the genuine user may be present in the second image 1520, and a third probability distribution 1503 of positions where an upper arm connected to a forearm of the genuine user may be present, based on the position of the second hand 1521. Using the first probability distribution 1501, the second probability distribution 1502, and the third probability distribution 1503, the wearable device 1000 may determine whether the second hand 1521 is a hand of the genuine user. For example, when a probability that a forearm of the genuine user is present in the position of the second forearm 1522 is 99% based on a result of comparing the position of the second forearm 1522 connected to the second hand 1521 with the second probability distribution 1502, the wearable device 1000 may determine that the second hand 1521 is a hand of the genuine user. Furthermore, when a probability that an upper arm of the genuine user is present in the position of the second upper arm 1523 is 99% based on a result of comparing the position of the second upper arm 1523 connected to the second forearm 1522 with the third probability distribution 1503, the wearable device 1000 may determine that the second hand 1521 is a hand of the genuine user.

For example, referring to a third image 1530 capturing the detection area 100, when a third hand 1531 and a third forearm 1532 connected to the third hand 1531 are detected in the third image 1530, the wearable device 1000 may obtain the first probability distribution 1501 of positions where a hand of the genuine user may be present in the third image 1530 and the second probability distribution 1502 of positions where a forearm connected to a hand of the genuine user may be present in the third image 1530, based on the position of the third hand 1531. Using the first probability distribution 1501 and the second probability distribution 1502, the wearable device 1000 may determine whether the third hand 1531 is a hand of the genuine user. For example, when a probability that a forearm of the genuine user is present in the position of the third forearm 1532 is 0.00001% based on a result of comparing the position of the third forearm 1532 connected to the third hand 1531 with the second probability distribution 1502, the wearable device 1000 may determine that the third hand 1531 is a hand of someone else.

Turning back to FIG. 13, in operations S1330 and S1340, the wearable device 1000 may identify a gesture of a recognized hand when the recognized hand is determined to be a hand of the genuine user.

In an embodiment, the wearable device 1000 may identify a gesture of the recognized hand by comparing a movement of the hand detected in the image of the detection area 100 with a predefined hand movement in a database. Furthermore, in an embodiment, the wearable device 1000 may use a machine learning model (e.g., a DNN) to identify a gesture of a hand included in the image of the detection area 100. Operation S1340 corresponds to operation S820 of FIG. 8, so the detailed description thereof will be omitted.

In operation S1350, the wearable device 1000 may perform an instruction corresponding to the identified gesture.

In an embodiment, the wearable device 1000 may perform an instruction corresponding to the gesture based on a table that maps between gestures and instructions. For example, instructions corresponding to gestures may include an instruction to select particular content, an instruction to run a particular application, an instruction to manipulate a virtual object (e.g., an instruction to scale a virtual object up or down, an instruction to move a virtual object, an instruction to copy a virtual object, an instruction to delete a virtual object, etc.), an instruction to control power to the wearable device 1000, an instruction to transmit or receive data to or from an external device, etc., without being limited thereto.

In operations S1330 and S1360, when determining that the recognized hand is not a hand of the genuine user, the wearable device 1000 may ignore the recognized hand. For example, the wearable device 1000 may not identify a gesture of the recognized hand when the recognized hand is a hand of someone else.

Figure 16:
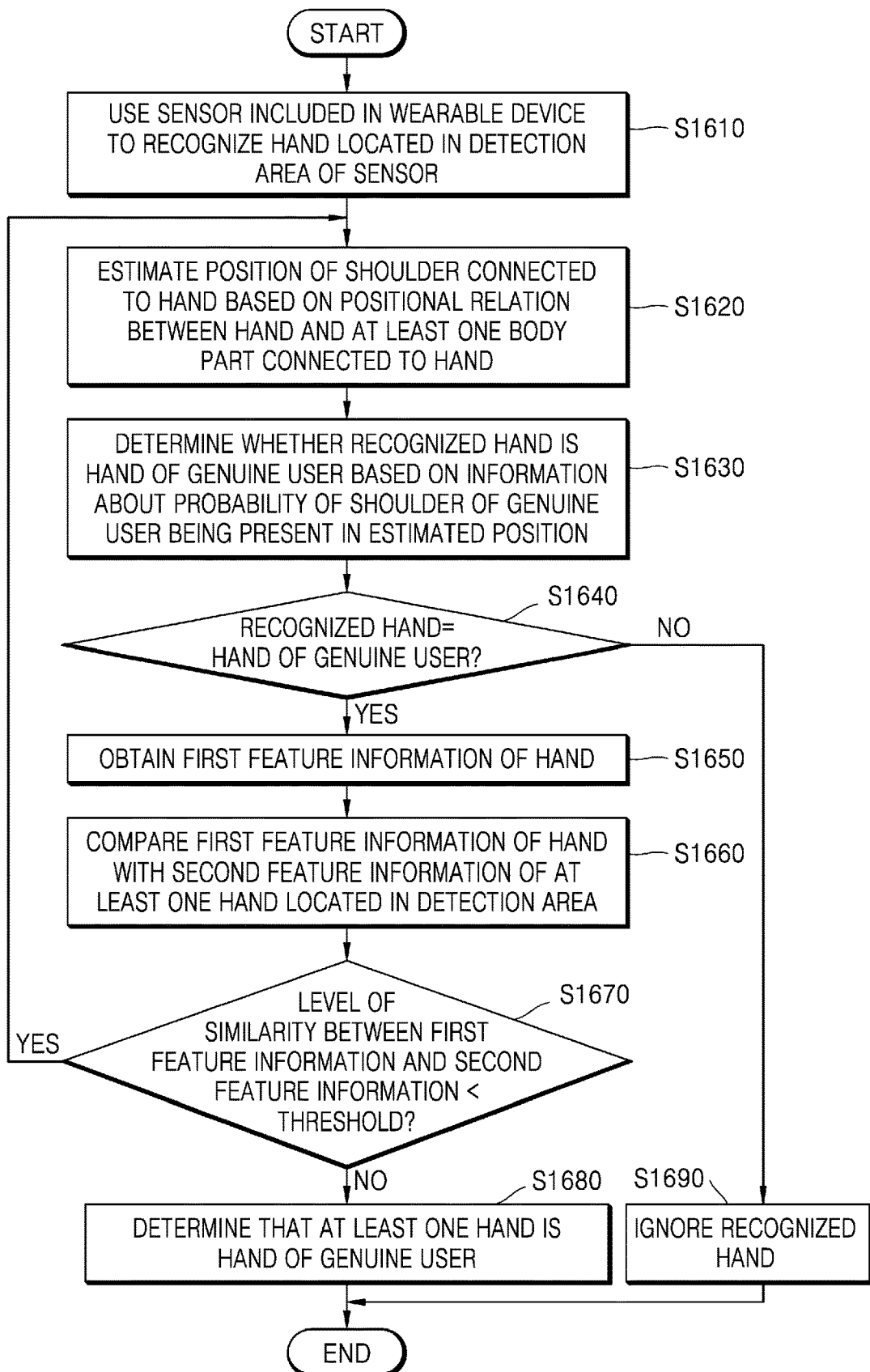
FIG. 16 is a flowchart for describing a method of identifying a hand of a genuine user based on feature information of a recognized hand, according to an embodiment.

FIG. 16 is a flowchart of a method of identifying a hand of a genuine user based on feature information of a recognized hand, according to an embodiment.

In operation S1610, the wearable device 1000 may use a sensor included in the wearable device 1000 to recognize a hand located in a detection area of the sensor.

In operation S1620, the wearable device 1000 may estimate a position of a shoulder connected to the recognized hand, based on a positional relation between the recognized hand and at least one body part connected to the recognized hand. For example, the wearable device 1000 may estimate a position of a shoulder connected to the recognized hand, based on a positional relation between the orientation of the recognized hand and at least one body part connected to the recognized hand.

In operation S1630, the wearable device 1000 may use information about a probability that a shoulder of the genuine user is present at the estimated position to determine whether the recognized hand is a hand of the genuine user.

Operations S1610 to S1630 correspond to operations S210 to S230 of FIG. 2, so the detailed description thereof will be omitted.

In operations S1640 and S1650, the wearable device 1000 may obtain first feature information of the recognized hand, when the recognized hand is determined to be a hand of the genuine user. The wearable device 1000 may determine whether at least one hand located in the detection area is a hand of the genuine user, based on the first feature information of the hand.

In an embodiment, the first feature information of the hand may include information about a size of the hand, color of the hand, whether the hand wears a glove, a nail polish color, a nail length, etc. Furthermore, the first feature information of the hand may include information about a sleeve length, a sleeve color, a sleeve type, etc., without being limited thereto.

For example, in operation S1660, the wearable device 1000 may compare the first feature information of the hand with second feature information of at least one hand located in the detection area 100.

In operations S1670 and S1680, when a level of similarity between the first feature information and the second feature information is equal to or greater than a threshold (e.g., 98%), the wearable device 1000 may determine that the at least one hand is a hand of the genuine user.

On the other hand, in operation S1670, when the level of similarity between the first feature information and the second feature information is less than the threshold (e.g., 98%), the wearable device 1000 may proceed back to operation S1620. For example, when the level of similarity between the first feature information and the second feature information is less than the threshold, the wearable device 1000 may estimate a position of at least one shoulder connected to the at least one hand. The wearable device 1000 may use information about a probability that a shoulder of the genuine user is present in the estimated position to determine whether the at least one hand is a hand of the genuine user.

For example, in a case that the feature information of a hand of the genuine user is changed when the genuine user wears a ring, changes clothes, changes nail polish color, etc., the wearable device 1000 may not recognize a hand having the same or similar feature information to the first feature information among at least one hand located in the detection area 100, and estimate a position of a shoulder again based on the at least one hand.

In operations S1640 and S1690, when determining that the recognized hand is not a hand of the genuine user, the wearable device 1000 may ignore the recognized hand. For example, the wearable device 1000 may not identify a gesture of the recognized hand when the recognized hand is a hand of someone else. For example, the wearable device 1000 may not identify a gesture of the recognized hand when the recognized hand is a hand of someone else.

In an embodiment, when the recognized hand is determined to be a hand of the genuine user based on the estimated shoulder position, the wearable device 1000 may scan feature information of the recognized hand, and determine that the recognized hand is a hand of the genuine user as long as the feature information of the recognized hand in the detection area 100 is not changed. Accordingly, in an embodiment, using the feature information of a hand of the genuine user, the wearable device 1000 may reduce computing resources for implementing an algorithm to estimate a position of a shoulder whenever a hand appears in the detection area 100 and determine a hand of the genuine user based on a probability value at the estimated position.

Figure 17:
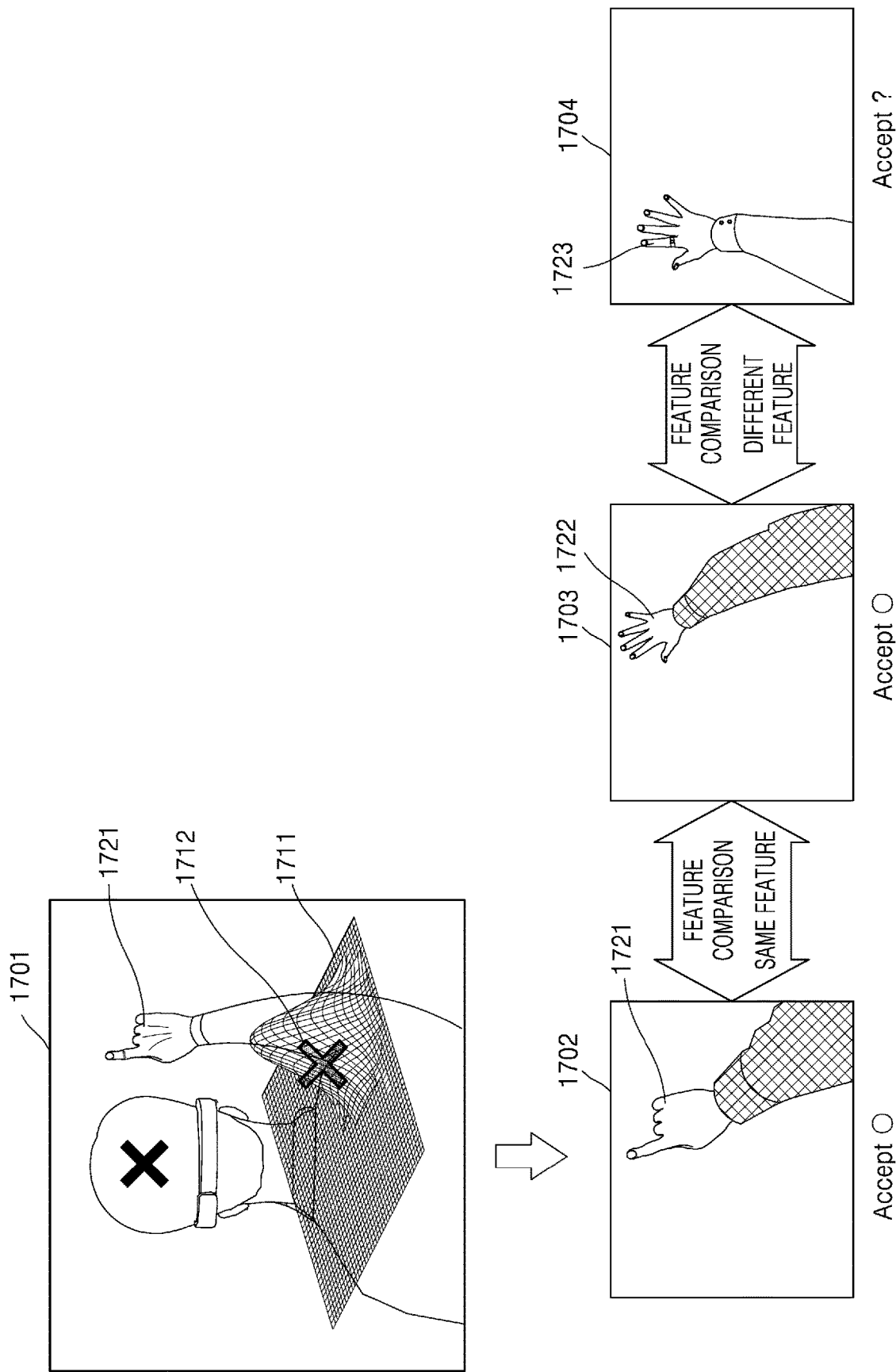
FIG. 17 is a diagram for describing a wearable device identifying a hand of a genuine user based on feature information of a recognized hand, according to an embodiment.

FIG. 17 is a diagram for describing a wearable device identifying a hand of a genuine user based on feature information of a recognized hand, according to an embodiment.

Referring to a first image 1701 of FIG. 17, the wearable device 1000 may obtain a probability value of a shoulder of the genuine user being present in an estimated shoulder position 1712 by comparing information about a probability of a shoulder of the genuine user being present 1711 with the estimated shoulder position 1712. In an embodiment, as a hand 1721 detected in the detection area 100 is a right hand, the wearable device 1000 may obtain a probability value of the right shoulder of the genuine user being present in the estimated position 1712. For example, when the probability value of the right shoulder of the genuine user being present in the estimated position 1712 is 95%, the wearable device 1000 may determine that the hand 1721 detected in the detection area 100 is a hand of the genuine user.

Referring to a second image 1702 of FIG. 17, as the hand 1721 detected in the detection area 100 is determined to be a hand of the genuine user, the wearable device 1000 may extract first feature information relating to the hand 1721 detected in the detection area 100 (e.g., color of the hand, whether a ring is worn on a finger, a nail length, a sleeve pattern, etc.) by scanning the hand 1721 detected in the detection area 100. The wearable device 1000 may determine whether hands subsequently detected in the detection area 100 are the hand of the genuine user, based on the first feature information.

Referring to a third image 1703 of FIG. 17, the wearable device 1000 may compare feature information of a hand 1722 detected in the detection area 100 with the first feature information. As the feature information of the hand 1722 detected in the detection area 100 corresponds to the first feature information, the wearable device 1000 may determine that the hand 1722 detected in the detection area 100 is a hand of the genuine hand.

Referring to a fourth image 1704 of FIG. 17, feature information relating to a hand of the genuine user may be changed when the genuine user wears a ring. In other words, feature information of a hand 1723 detected in the detection area 100 may be different from the first feature information. In this case, the wearable device 1000 may no longer use the first feature information to determine whether the hand 1723 detected in the detection area 100 is a hand of the genuine user. Accordingly, the wearable device 1000 may estimate a position of a shoulder connected to the hand 1723 detected in the detection area 100, and determine whether the detected hand 1723 is a hand of the genuine user, based on a probability value of the right shoulder of the genuine user being present in the estimated position. For example, when the probability value of the right shoulder of the genuine user being present in the estimated position is 98%, the wearable device 1000 may determine that the hand 1723 detected in the detection area 100 is a hand of the genuine user. As the hand 1723 detected in the detection area 100 is determined to be a hand of the genuine user, the wearable device 1000 may extract second feature information relating to the hand 1723 detected in the detection area 100 (e.g., color of the hand, whether a ring is worn on a finger, a nail length, a sleeve pattern, etc.) by scanning the hand 1723 detected in the detection area 100. The wearable device 1000 may determine whether hands subsequently detected in the detection area 100 is the hand of the genuine user, based on the second feature information.

Figure 18:
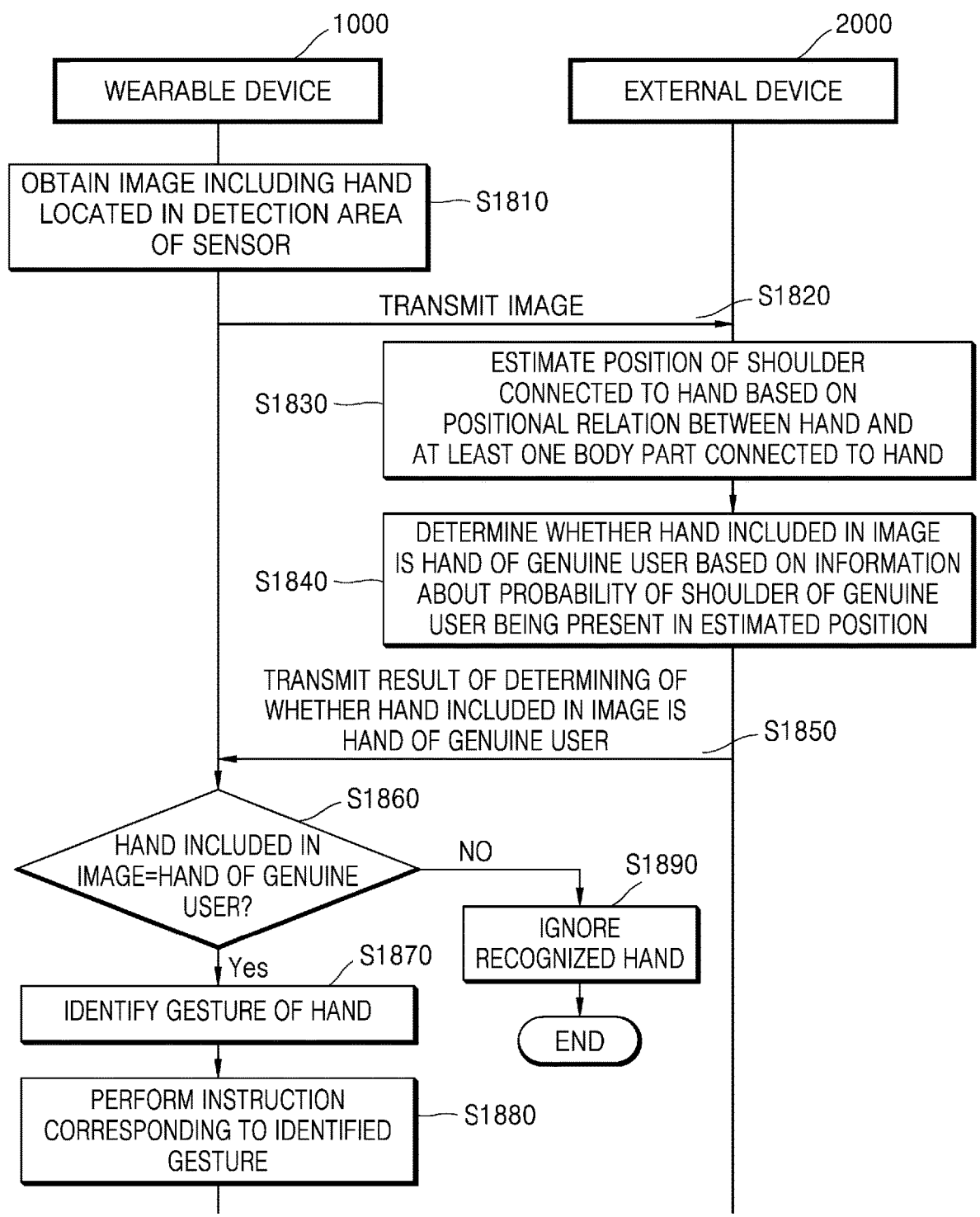
FIG. 18 is a flowchart for describing a method in which a wearable device works with an external device to identify a hand of a genuine user, according to an embodiment.

FIG. 18 is a flowchart of a method in which a wearable device works with an external device to identify a hand of a genuine user, according to an embodiment.

In operation S1860, the wearable device 1000 may obtain an image including a hand located in the detection area 100 of a sensor. In this case, the obtained image may be an image viewed from the genuine user wearing the wearable device 1000.

For example, the wearable device 1000 may use the sensor (e.g., an image sensor) to obtain (e.g., capture) an image including a hand located in the detection area 100 of the sensor. In an embodiment, the image may be a color image (an RGB image) or a black and white image. Furthermore, the image may be a 3D image or a 2D image; a moving image or a still image, without being limited thereto. For example, the image may be at least one of an ultrasound image, an infrared image, or a dynamic vision sensor image.

In operation S1820, the wearable device 1000 may transmit the image including a hand to an external device 2000. In this case, the wearable device 1000 may ask the external device 2000 whether the hand detected in the image is a hand of the genuine user wearing the wearable device 1000.

In an embodiment, the external device 2000 may be a server device connected to the wearable device 1000 or a host device (e.g., a mobile terminal) connected to the wearable device 1000, without being limited thereto. In an embodiment, the wearable device 1000 may be connected to the external device 2000 via a short-range communication network (e.g., Bluetooth, Wi-Fi, etc.) or mobile communication network.

In operation S1830, the external device 2000 may analyze the received image to estimate a position of a shoulder connected to the hand included in the image based on a positional relation between the hand and at least one body part connected to the hand.

In an embodiment, the external device 2000 may use predefined template images of hands to recognize a hand located in the detection area 100. For example, the external device 2000 may detect a hand from the received image by comparing the predefined template images of hands to the received image. Furthermore, the external device 2000 may use the predefined template images of hands to determine whether the hand detected from the received image is a right hand or a left hand. The external device 1000 may use the predefined template images of hands to determine the orientation of the hand detected from the received image.

In an embodiment, the external device 2000 may use a machine learning model (or referred to as an AI model) to detect a hand from the received image. For example, the external device 2000 may use a DNN model that learns images of various hands to recognize a hand from the received image. When the external device 2000 inputs the received image to the machine learning model (e.g., DNN), the machine learning model may detect a form of the hand from the input image.

In an embodiment, the external device 2000 may detect a hand from the received image, and further detect from the received image at least one body part connected to the detected hand. The at least one body part connected to the hand may include at least one of a wrist, a forearm, an elbow, or an upper arm, but is not limited thereto. In this case, the external device 2000 may finally estimate a position of a shoulder connected to the detected hand by using a positional relation between the detected hand and at least one body part connected to the hand from the received image. The external device 2000 may use a machine learning model to estimate a position of the shoulder connected to the hand detected from the received image. For example, the external device 2000 may use a generative DNN model 501 or a discriminative DNN model 502 to estimate a position of the shoulder connected to the hand.

In an embodiment, when the received image includes a shoulder, the external device 2000 may directly estimate a position of the shoulder connected to the hand by analyzing the received image. Operation S1830 corresponds to operation S220 of FIG. 2, so the detailed description thereof will be omitted.

In operation S1840, the external device 2000 may use information about a probability that a shoulder of the genuine user is present in the estimated position to determine whether the hand included in the image is a hand of the genuine user.

In an embodiment, the external device 2000 may obtain the information about the probability of a shoulder of the genuine user being present. The information about the probability of a shoulder of the genuine user being present may include probability values that a shoulder of the genuine user may be actually present on 3D spatial coordinates with respect to the wearable device 1000 (or the head of the genuine user). The information about the probability of a shoulder of the genuine user being present may be represented with a set of probability values or by a probability distribution chart, without being limited thereto. The information about the probability of a shoulder of the genuine user being present may include information about a probability of the right shoulder being present and information about the probability of the left shoulder being present.

In an embodiment, the external device 2000 may obtain a probability value of a shoulder of the genuine user being present in the estimated shoulder position by comparing the information about the probability of a shoulder of the genuine user being present with the estimated shoulder position. For example, when the hand detected from the received image is a right hand, the external device 2000 may obtain a probability value of the right shoulder of the genuine user being present in the estimated position. When the probability value of the right shoulder of the genuine user being present in the estimated position is equal to or greater than a threshold (e.g., 90%), the external device 2000 may determine that the hand detected from the received image is a hand of the genuine user. On the other hand, when the probability value of the right shoulder of the genuine user being present in the estimated position is less than the threshold (e.g., 90%), the external device 2000 may determine that the hand detected from the received image is not a hand of the genuine user.

In operation S1850, the external device 2000 may transmit a result of determining whether the hand included in the image is a hand of the genuine user to the wearable device 1000.

In an embodiment, the external device 2000 may transmit the result of determining whether the hand included in the image is a hand of the genuine user to the wearable device 1000 via a short-range wireless communication network or a mobile communication network.

In operations S1860 and S1870, the wearable device 1000 may identify a gesture of a hand in the detection area 100 when the hand included in the image is determined to be a hand of the genuine user.

In an embodiment, the wearable device 1000 may identify a gesture of the recognized hand by comparing a movement of the hand detected in the image of the detection area 100 with a predefined hand movement in a database. In an embodiment, the wearable device 1000 may use a machine learning model (e.g., a DNN) to identify a gesture of a hand included in the image of the detection area 100.

In operation S1880, the wearable device 1000 may perform an instruction corresponding to the identified gesture.

In an embodiment, the wearable device 1000 may perform an instruction corresponding to the gesture based on a table that maps between gestures and instructions. For example, instructions corresponding to gestures may include an instruction to select particular content, an instruction to run a particular application, an instruction to manipulate a virtual object (e.g., an instruction to scale a virtual object up or down, an instruction to move a virtual object, an instruction to copy a virtual object, an instruction to delete a virtual object, etc.), an instruction to control power to the wearable device 1000, an instruction to transmit or receive data to or from an external device, etc., without being limited thereto.

In operations S1860 and S1890, when determining that the recognized hand is not a hand of the genuine user, the wearable device 1000 may ignore the recognized hand. In an embodiment, the wearable device 1000 may ignore a gesture of the recognized hand when the recognized hand is a hand of someone else.

Figure 19:
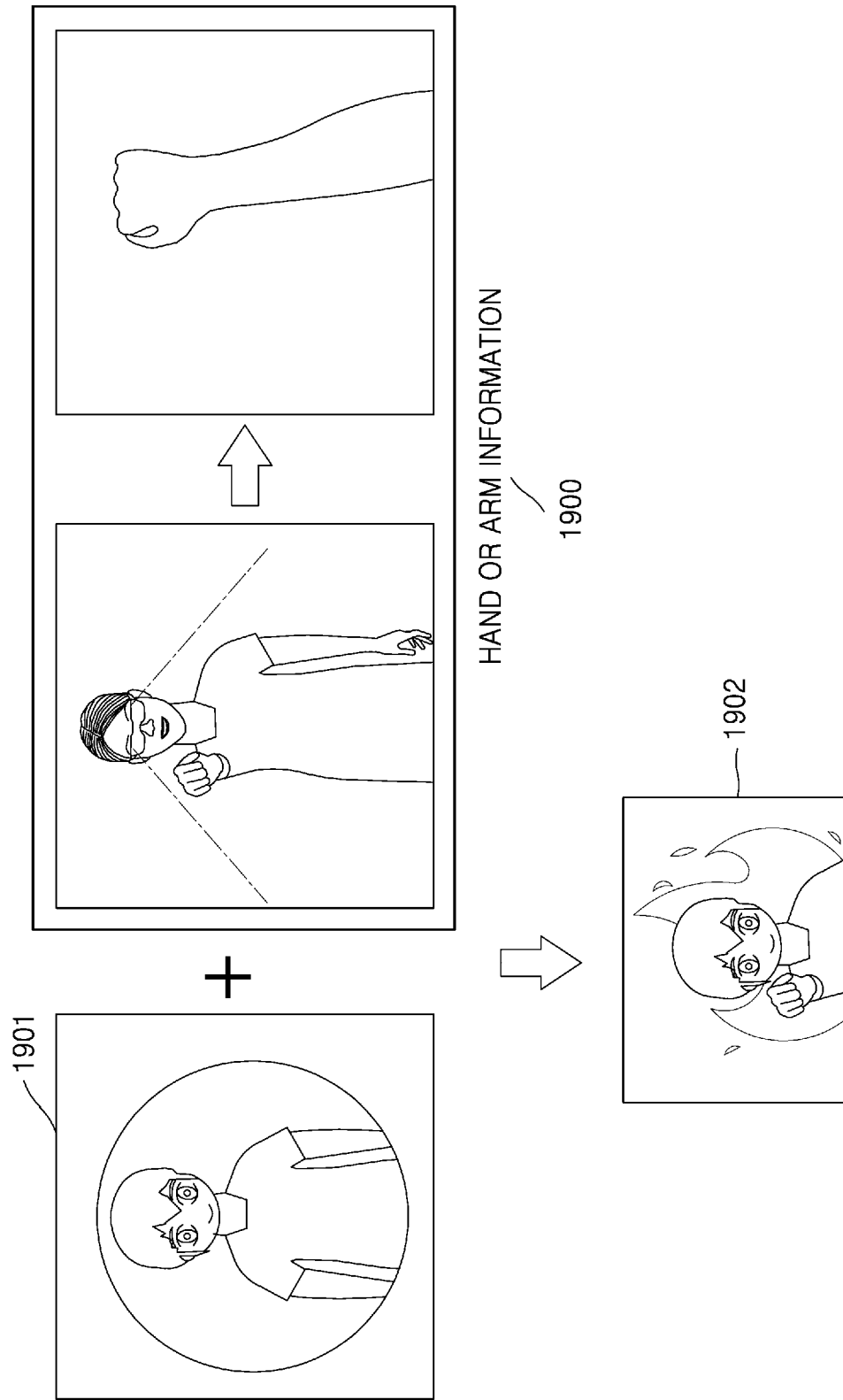

FIGS. 19 and 20 are diagrams for describing an operation of providing avatar images using hand or arm information, according to an embodiment.

Referring to FIG. 19, the wearable device 1000 may provide a first avatar image 1901 of the upper half of a body corresponding to the genuine user wearing the wearable device 1000 to a device of someone else (e.g., a wearable device of another person). In this case, the wearable device 1000 may apply hand or arm information 1900 of the genuine user to the first avatar image 1901 to create a realistic avatar image 1902.

For example, the wearable device 1000 may identify the form (e.g., a clenching state) of the hand located in the detection area 100, and create the realistic second avatar image 1902 based on the identified form of the hand. The wearable device 1000 may provide the realistic second avatar image 1902 to a device of someone else (e.g., a wearable device of another person).

Referring to FIG. 20, the wearable device 1000 may detect a hand of the genuine user, and create an avatar image corresponding to a gesture of the hand of the genuine user. A case that a first user 2001 and a second user 2002 are each waving a hand will be described as an example. A first hand 2021 of the first user 2001 and a second hand 2022 of the second user 2002 may be both detected in the detection area 100 of the wearable device 1000 worn by the second user 2002. In this case, when the wearable device 1000 creates a first avatar image 2003 corresponding to the second user 2002 based on motions of both the first hand 2021 and the second hand 2022, the first avatar image 2003 may appear as if the second user 2002 is waving both hands.

However, in an embodiment, the wearable device 1000 may estimate a position of a shoulder connected to each of the first and second hands 2021 and 2022, and based on the estimated positions of the shoulders, determine that only the second hand 2022 is a hand of the second user 2002 but the first hand 2022 is not a hand of the second user 2002. In this case, the wearable device 1000 may use a motion of the second hand 2022 to create the second avatar image 2003 corresponding to the second user 2002. At this time, the second avatar image 2004 may appear to be waving only one hand like the second user 2002.

Figure 21:
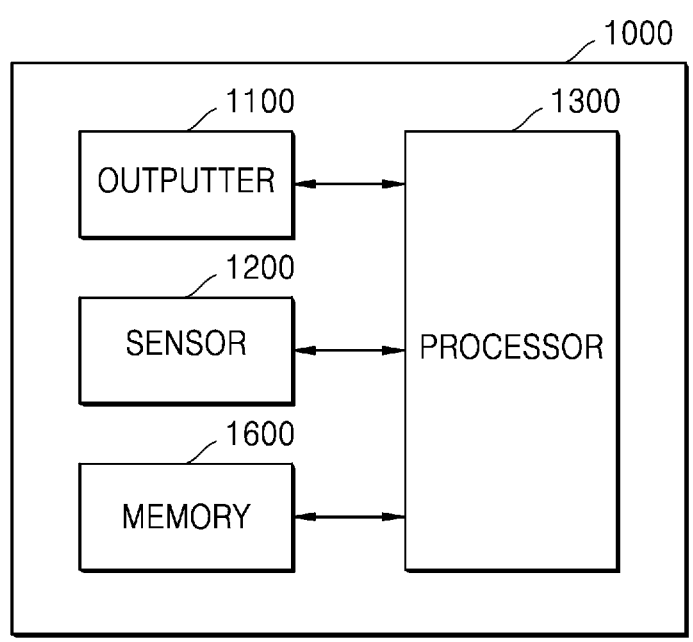
FIGS. 21 and 22 are block diagrams for describing features of a wearable device, according to an embodiment.
Figure 22:
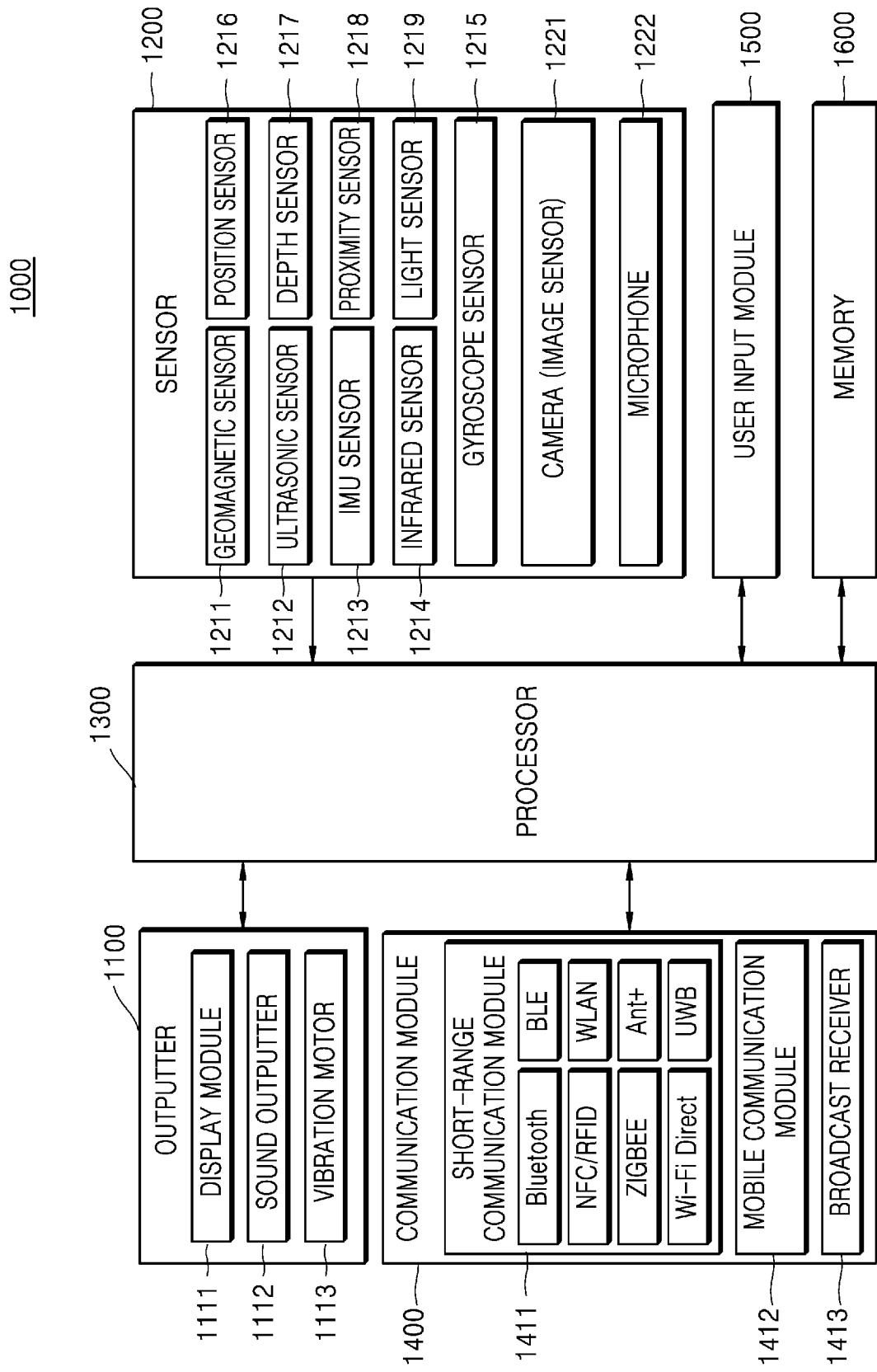

FIGS. 21 and 22 are block diagrams for describing features of a wearable device, according to an embodiment.

As shown in FIG. 21, in an embodiment, the wearable device 1000 may include an outputter 1100, at least one sensor 1200, a processor 1300, and a memory 1600. However, not all the illustrated components are essential. The wearable device 1000 may be implemented with more or fewer components than illustrated. For example, as shown in FIG. 22, the wearable device 1000 in an embodiment may further include a communication module 1400 and a user input module 1500 in addition to the outputter 1100, the at least one sensor 1200, the processor 1300, and the memory 1600.

The aforementioned components will now be described in detail.

The outputter 1100 for outputting audio, video, or vibration signals may include a display module 1111, a sound outputter 1112, a vibration motor 1113, etc.

The display module 1111 displays information processed by the wearable device 1000. For example, the display module 1111 may display a call-related user interface (UI) or graphic user interface (GUI) in a call mode; display a virtual input interface in an input mode; display game-related content in a game play mode.

In an embodiment, the display module 1111 may be a transparent or opaque display. The transparent display refers to an information display device having a form in which a rear side of the screen for displaying information is transparent. The transparent display includes transparent elements, and may control the level of transparency by controlling light transmittance to the transparent elements or by controlling RGB values of each pixel.

When the display module 1111 and a touch pad are implemented in a layered structure to constitute a touchscreen, the display module 1111 may also be used as an input device in addition to the output device. The touchscreen may detect a touch gesture of a user over the touchscreen and forward information about the touch gesture to the controller 1300. The touch gesture of the user may include tapping, touching and holding, double tapping, dragging, panning, flicking, dragging and dropping, swiping, etc.

The display module 1111 may include at least one of a liquid crystal display (LCD), a thin film transistor-liquid crystal display (TFT-LCD), organic light-emitting diodes (OLEDs), a flexible display, a 3D display, or an electrophoretic display. Furthermore, depending on a form of implementation of the wearable device 1000, the wearable device 1000 may include two or more display modules 1111.

The sound outputter 1112 may output audio data received from the communication module 1400 or stored in the memory 1600. The sound outputter 1112 outputs sound signals related to a function being performed in the wearable device 1000 (e.g., identifying a hand of the genuine user, running an application, call signal incoming sound, message incoming sound, etc.). The sound outputter 1112 may include a speaker, buzzer, etc.

The vibration motor 1113 may output a vibration signal. For example, the vibration motor 1113 may output a vibration signal corresponding to an output of audio data or video data (e.g., call signal incoming sound, message incoming sound, etc.). The vibration motor 1113 may also output a vibration signal when an input is made on a virtual input interface.

The at least one sensor 1200 may detect a condition of or around the wearable device 1000 and forward the detected information to the processor 1300.

In an embodiment, the at least one sensor 1200 may include a geomagnetic sensor 1211, an ultrasonic sensor 1212, an inertial measurement unit (IMU) sensor 1213, an infrared sensor 1214, a gyroscope sensor 1215, a position sensor 1216, a depth sensor 1217, a proximity sensor 1218, a camera (image sensor) 1221, and a microphone 1222, without being limited thereto. Those of ordinary skill in the art may intuitively infer the functions of the respective sensors, so the detailed description thereof will be omitted.

The processor 1300 controls general operation of the wearable device 1000. For example, the processor 1300 may execute programs stored in the memory 1600 to generally control the outputter 110, the at least one sensor 1400, the user input module 1500, the memory 1600, etc.

In an embodiment, the processor 1300 may include an AI processor for building up a machine learning model without being limited thereto. In an embodiment, the AI processor 1300 may be implemented with a separate chip from the processor 1300.

In an embodiment, the processor 1300 may use the at least one sensor 1200 to recognize a hand located in the detection area 100 of the at least one sensor 1200. For example, the processor 1300 may obtain an image that captures the detection area 100 from the camera (image sensor) 1221 when a hand is detected in the detection area 100.

In an embodiment, the processor 1300 may estimate a position of a shoulder connected to the recognized hand, based on a positional relation between the recognized hand and at least one body part connected to the recognized hand.

In an embodiment, the processor 1300 may use information about a probability that a shoulder of the genuine user wearing the wearable device 1000 is present at the estimated position to determine whether the recognized hand is a hand of the genuine user. For example, the processor 1300 may obtain the information about the probability of a shoulder of the genuine user being present, and obtain a probability value in the estimated position from the information about the probability of a shoulder of the genuine user being present. The processor 1300 may determine that the recognized hand is a hand of the genuine user, when the probability value in the estimated position is greater than a threshold. On the other hand, the processor 1300 may determine that the recognized hand is a hand of someone else, when the probability value in the estimated position is equal to or less than the threshold.

When the recognized hand is determined to be a hand of the genuine user, the processor 1300 may identify a gesture of the recognized hand and perform an instruction corresponding to the identified gesture. On the other hand, when the recognized hand is not a hand of the genuine user, the processor 1300 may ignore the recognized hand.

The processor 1300 may provide, through the outputter 1100, notification information indicating whether a hand of the genuine user is located in the detection area 100, when the recognized hand is determined to be a hand of the genuine user. For example, the processor 1300 may display a first identification image through the outputter 1100 when a hand of the genuine user comes into the detection area, and a second identification image through the outputter 1100 when the hand of the genuine user deviates from the detection area 100.

In an embodiment, the processor 1300 may obtain first feature information of the recognized hand when the recognized hand is determined to be a hand of the genuine user. The processor 1300 may determine whether at least one hand located in the detection area 100 is a hand of the genuine user, based on the first feature information of the hand. For example, the processor 1300 may compare the first feature information of the hand with second feature information of at least one hand located in the detection area 100. When a level of similarity between the first feature information and the second feature information is equal to or greater than a threshold, the processor 1300 may determine that the at least one hand is a hand of the genuine user. On the other hand, when the level of similarity between the first feature information and the second feature information is less than the threshold, the processor 1300 may estimate a position of at least one shoulder connected to at least one hand to correctly determine whether the at least one hand is a hand of the genuine user. In this case, the processor 1300 may use information about a probability that a shoulder of the genuine user is present in the estimated position to determine whether the at least one hand is a hand of the genuine user.

In an embodiment, the processor 1300 may use the at least one sensor 1200 to recognize a hand located in the detection area 100 of the at least one sensor 1200, and determine whether the recognized hand is a hand of the genuine user wearing the wearable device 1000 based on information about a probability that a hand of the genuine user may be detected at each position in the detection area 100.

The communication module 1400 may include one or more components that allow the wearable device 1000 to communicate with an external device 2000 (e.g., a server device, a mobile terminal, etc.). For example, the communication module 1400 may include a short-range communication module 1411, a mobile communication module 1412, and a broadcast receiver 1413.

The short-range communication module 1411 may include a Bluetooth communication module, a Bluetooth low energy (BLE) communication module, a near field communication (NFC) module, a wireless local area network (WLAN), e.g., Wi-Fi, communication module, a Zigbee communication module, an infrared data association (IrDA) communication module, a Wi-Fi direct (WFD) communication module, an ultra wideband (UWB) communication module, an Ant+ communication module, etc., without being limited thereto.

The mobile communication module 1412 transmits or receives wireless signals to and from at least one of a base station, an external terminal, or a server in a mobile communication network. The RF signal may include a voice call signal, a video call signal or different types of data involved in transmission/reception of a text/multimedia message.

The broadcast receiver 1413 receives broadcast signals and/or broadcasting-related information from the outside on a broadcasting channel. The broadcasting channel may include a satellite channel or a terrestrial channel. Depending on the implementation, the wearable device 1000 may not include the broadcast receiver 1413.

The user input module 1500 refers to a means that allows the user to enter data to control the wearable device 1000. For example, the user input module 1500 may include a keypad, a dome switch, a (capacitive, resistive, infrared detection type, surface acoustic wave type, integral strain gauge type, piezoelectric effect type) touch pad, a jog wheel, a jog switch, etc., without being limited thereto.

In an embodiment, the user input module 1500 may include a gesture detector. The gesture detector may identify a gesture of a hand of the user, and detect an instruction corresponding to the gesture of the hand of the user. Furthermore, in an embodiment, the user input module 1500 may include the microphone 1222. In this case, the user input module 1500 may receive a voice command of the user through the microphone 1222.

The memory 1600 may store a program for processing and controlling of the processor 1300, input/output data (e.g., camera images, applications, contents, etc.), or one or more instructions.

The memory 1600 may include at least one type of storage medium including a flash memory, a hard disk, a multimedia card micro type memory, a card type memory (e.g., SD or XD memory), a random access memory (RAM), a static RAM (SRAM), a read-only memory (ROM), an electrically erasable programmable ROM (EEPROM), a programmable ROM (PROM), a magnetic memory, a magnetic disk, and an optical disk. The program stored in the memory 1600 may be classified into multiple modules on the function basis.

The method according to an embodiment may be implemented in program instructions which are executable by various computing means and recorded in computer-readable media. The computer-readable media may include program instructions, data files, data structures, etc., separately or in combination. The program instructions recorded on the computer-readable media may be designed and configured specially for the disclosure, or may be well-known to those of ordinary skill in the art of computer software. Examples of the computer readable recording medium include ROMs, RAMs, Compact Disc (CD)-ROMs, magnetic tapes, floppy disks, optical data storage devices, etc. The computer readable recording medium can also be distributed over network-coupled computer systems so that the computer readable code is stored and executed in a distributed fashion. Examples of the program instructions include not only machine language codes but also high-level language codes which are executable by various computing means using an interpreter.

Some embodiments of the disclosure may be implemented in the form of a computer-readable recording medium that includes computer-executable instructions such as the program modules executed by the computer. The computer-readable recording medium may be an arbitrary available medium that may be accessed by the computer, including volatile, non-volatile, removable, and non-removable mediums. The computer-readable recording medium may also include a computer storage medium and a communication medium. The volatile, non-volatile, removable, and non-removable mediums may be implemented by an arbitrary method or technology for storage of information, such as computer-readable instructions, data structures, program modules, or other data. The communication medium generally includes computer-readable instructions, data structures, program modules, or other data or other transmission mechanism for modulated data signals like carrier waves, and include arbitrary information delivery medium. Furthermore, some embodiments may be implemented in a computer program or a computer program product including computer-executable instructions.

Several embodiments of the disclosure have been described, but it will be understood that various modifications can be made without departing the scope of the disclosure. Thus, it will be apparent to those ordinary skilled in the art that the disclosure is not limited to the embodiments described, but can encompass not only the appended claims but the equivalents.

The invention claimed is:

1. A method of identifying, by a wearable device, a hand of a user wearing the wearable device, the method comprising:
   detecting a hand located in a detection area of at least one sensor included in the wearable device;
   determining a position of a shoulder connected to the detected hand based on a positional relation between an orientation of the detected hand and at least one body part connected to the detected hand; and
   determining that the detected hand is a hand of the based on information about a probability of a shoulder of the user being present in the determined position.

2. The method of claim 1, wherein the determining of that the detected hand is the hand of the user comprises
   obtaining information about a probability of a shoulder of the user being present;
   obtaining a probability value in the determined position from the information about the probability of a shoulder of the user being present; and
   determining that the detected hand is the hand of the user when the probability value is greater than a threshold.

3. The method of claim 1, further comprising:
   identifying a gesture of the detected hand when the detected hand is determined to be the hand of the user; and
   performing an instruction corresponding to the identified gesture.

4. The method of claim 1, further comprising ignoring the detected hand when the detected hand is not determined to be the hand of the user.

5. The method of claim 1, further comprising providing notification information indicating whether the hand of the user is located in the detection area when the detected hand is determined to be the hand of the user.

6. The method of claim 5, wherein the providing of the notification information comprises:
   displaying a first identification image in a display area provided by the wearable device when the hand of the user comes into the detection area; and
   displaying a second identification image in the display area when the hand of the user deviates from the detection area.

7. The method of claim 1, further comprising:
   obtaining first feature information of the hand when the detected hand is determined to be the hand of the user; and
   determining that at least one hand located in the detection area is the hand of the user based on the first feature information of the hand.

8. The method of claim 7, further comprising:
   comparing the first feature information of the hand with second feature information of the at least one hand located in the detection area;
   determining a position of at least one shoulder connected to the at least one hand when a level of similarity between the first feature information and the second feature information is less than a threshold; and
   determining that the at least one hand is the hand of the user based on information about a probability of a shoulder of the user being present in the determined position.

9. The method of claim 1, wherein the determining of the position of the shoulder connected to the detected hand comprises:
   obtaining an image including a hand located in the detection area; and
   detecting at least one of a forearm connected to the hand, an upper arm connected to the forearm, and a shoulder connected to the upper arm by analyzing the obtained image.

10. A wearable device comprising:
    an outputter;
    at least one sensor;
    a memory storing one or more instructions; and
    a processor coupled to the memory,
    wherein the processor is configured to execute the one or more instructions to perform operations of:
    detecting a hand located in a detection area of the at least one sensor included in the wearable device;
    determining a position of a shoulder connected to the detected hand based on a positional relation between an orientation of the detected hand and at least one body part connected to the detected hand; and
    determining that the detected hand is a hand of a user wearing the wearable device based on information about a probability of a shoulder of the user being present in the determined position.

11. The wearable device of claim 10, wherein the processor is configured to
    obtain information about a probability of a shoulder of the user being present;
    obtain a probability value in the determined position from the information about the probability of a shoulder of the user being present; and
    determine that the detected hand is the hand of the user when the probability value is greater than a threshold.

12. The wearable device of claim 10, wherein the processor is further configured to:
    identify a gesture of the detected hand when the detected hand is determined to be the hand of the user; and
    perform an instruction corresponding to the identified gesture.

13. The wearable device of claim 10, wherein the processor is further configured to ignore the detected hand when the detected hand is not determined to be the hand of the user.

14. The wearable device of claim 10, wherein the processor is further configured to provide, through the outputter, notification information indicating whether the hand of the user is located in the detection area when the detected hand is determined to be the hand of the user.

15. The wearable device of claim 14, wherein the processor is configured to:
   display a first identification image on the outputter when the hand of the user comes into the detection area; and
   display a second identification image on the outputter when the hand of the user deviates from the detection area.

16. The wearable device of claim 10, wherein the processor is further configured to:
   obtain first feature information of the detected hand when the detected hand is determined to be the hand of the user; and
   determine that at least one hand located in the detection area is the hand of the user based on the first feature information of the hand.

17. The wearable device of claim 16, wherein the processor is further configured to:
   compare the first feature information of the hand with second feature information of the at least one hand located in the detection area;
   determine a position of at least one shoulder connected to the at least one hand when a level of similarity between the first feature information and the second feature information is less than a threshold; and
   determine that the at least one hand is the hand of the user based on information about a probability of a shoulder of the user being present in the determined position.

18. A computer program product including at least one non-transitory recording medium having a program stored thereon to cause a processor to perform the method according to claim 1.

19. The computer program product of claim 18, wherein the determining of that the detected hand is a hand of the user comprises:
   obtaining information about a probability of a shoulder of the user being present;
   obtaining a probability value in the determined position from the information about the probability of a shoulder of the user being present; and
   determining that the detected hand is the hand of the user when the probability value is greater than a threshold.

* * * * *